US011233809B2

(12) United States Patent
Iwaki et al.

(10) Patent No.: US 11,233,809 B2
(45) Date of Patent: Jan. 25, 2022

(54) LEARNING DEVICE, RELEARNING NECESSITY DETERMINATION METHOD, AND RELEARNING NECESSITY DETERMINATION PROGRAM

(71) Applicant: NIPPON TELEGRAPH AND TELEPHONE CORPORATION, Tokyo (JP)

(72) Inventors: Yuta Iwaki, Musashino (JP); Shingo Orihara, Musashino (JP); Yang Zhong, Musashino (JP); Tohru Sato, Musashino (JP); Yohsuke Shimada, Musashino (JP)

(73) Assignee: NIPPON TELEGRAPE AND TELEPHONE CORPORATION, Tokyo (JP)

( * ) Notice: Subject to any disclaimer, the term of this patent is extended or adjusted under 35 U.S.C. 154(b) by 174 days.

(21) Appl. No.: 16/487,834

(22) PCT Filed: Feb. 20, 2018

(86) PCT No.: PCT/JP2018/005962
§ 371 (c)(1),
(2) Date: Aug. 22, 2019

(87) PCT Pub. No.: WO2018/159380
PCT Pub. Date: Sep. 7, 2018

(65) Prior Publication Data
US 2020/0252419 A1   Aug. 6, 2020

(30) Foreign Application Priority Data
Mar. 3, 2017   (JP) .............................. JP2017-041123

(51) Int. Cl.
*H04L 29/06* (2006.01)
*H04L 12/26* (2006.01)
(Continued)

(52) U.S. Cl.
CPC ......... *H04L 63/1425* (2013.01); *G06N 20/00* (2019.01); *H04L 63/1416* (2013.01); *H04L 67/02* (2013.01); *H04L 67/30* (2013.01)

(58) Field of Classification Search
USPC .................................................... 726/23, 30
See application file for complete search history.

(56) References Cited

U.S. PATENT DOCUMENTS 7,831,586 B2 * 11/2010 Reitter .................. G06Q 30/00
707/709
8,650,648 B2 * 2/2014 Howard ................ G06F 21/567
726/24

(Continued)

FOREIGN PATENT DOCUMENTS

WO        2015/186662 A1    12/2015

OTHER PUBLICATIONS

International Search Report and Written Opinion dated Apr. 17, 2018 for PCT/JP2018/005962 filed on Feb. 20, 2018, 6 pages including English Translation of the International Search Report.

*Primary Examiner* — Jude Jean Gilles
(74) *Attorney, Agent, or Firm* — Xsensus LLP

(57) ABSTRACT

An extraction unit-extracts a specific request from among requests that do not match with a profile on the basis of a similarity to a request to a server, where the profile determines whether the request is an attack. Further, a determination unit determines whether the specific request extracted by the extraction unit meets a predetermined condition indicating that the specific request is continuously transmitted from a certain number or more of transmission sources. Furthermore, a control unit relearns the profile if the determination unit determines that the specific request meets the predetermined condition.

8 Claims, 24 Drawing Sheets

(51) Int. Cl.
  *G06N 20/00* (2019.01)
  *H04L 29/08* (2006.01)
  *H04W 24/10* (2009.01)
  *H04W 84/04* (2009.01)

(56) References Cited

U.S. PATENT DOCUMENTS

| | | | | |
|---|---|---|---|---|
| 9,668,156 | B2* | 5/2017 | Jung | H04W 24/10 |
| 10,952,014 | B2* | 3/2021 | Yang | H04W 4/021 |
| 2003/0159069 | A1* | 8/2003 | Choi | H04L 63/1425 |
| | | | | 726/23 |
| 2004/0087329 | A1* | 5/2004 | Shinoi | H04L 1/0034 |
| | | | | 455/522 |
| 2005/0188215 | A1* | 8/2005 | Shulman | H04L 69/22 |
| | | | | 713/188 |
| 2008/0059596 | A1* | 3/2008 | Ogawa | H04L 63/1416 |
| | | | | 709/207 |
| 2010/0212013 | A1* | 8/2010 | Kim | H04L 45/12 |
| | | | | 726/23 |
| 2017/0126724 | A1 | 5/2017 | Zhong et al. | |
| 2018/0167406 | A1* | 6/2018 | Zhong | H04L 63/1425 |

\* cited by examiner

FIG.10

| TIME SLOT | path1:new_key1 | path1:new_key2 |
|---|---|---|
| (1) 0:00 TO 4:00 | 0:01:34.123  192.168.0.1<br>0:01:45.333  192.168.0.3<br>0:02:23.111  192.168.0.1<br>..<br>3:59:48.123  192.168.0.8 | 0:02:34.456  192.168.10.1<br>0:03:45.234  192.168.10.1<br>0:45:23.345  192.168.10.1<br>..<br>3:57:23.234  192.168.10.1 |
| (2) 4:00 TO 8:00 | 4:00:01.000  192.168.0.2<br>.. | 4:05:10.345  192.168.0.3<br>.. |
| .. | | |
| (N) hh:mm TO HH:MM | hh:mm:01.000  192.168.0.7<br>hh:mm:02:345  192.168.0.1<br>.. | hh:mm:05.555  192.168.10.1<br>hh:mm:07.777  192.168.10.1<br>.. |

FIG.11

| TIME SLOT | path1:new_key1 | path1:new_key2 |
|---|---|---|
| (1) 0:00 TO 4:00 | 0:01:34.123 192.168.0.1<br>0:01:45.333 192.168.0.3<br>..<br>3:59:48.123 192.168.0.8 } NUMBER OF TYPES 3 >THRESHOLD | 0:02:34.456 192.168.10.1<br>0:03:45.234 192.168.10.1<br>..<br>3:57:23.234 192.168.10.1 } NUMBER OF TYPES 1 ≤THRESHOLD |
| (2) 4:00 TO 8:00 | 4:00:01.000 192.168.0.2<br>.. } NUMBER OF TYPES ≤THRESHOLD | 4:05:10.345 192.168.0.3<br>.. } NUMBER OF TYPES >THRESHOLD |
| .. | | |
| (N) hh:mm TO HH:MM | hh:mm:01.000 192.168.0.7<br>hh:mm:02:345 192.168.0.1<br>.. } NUMBER OF TYPES >THRESHOLD | hh:mm:05.555 192.168.10.1<br>hh:mm:07.777 192.168.10.1<br>.. } NUMBER OF TYPES ≤THRESHOLD |

FIG.13

| TIME SLOT | path1:new_key1 | | path1:new_key2 | |
|---|---|---|---|---|
| (1) 0:00 TO 4:00 | 0:01:34.123 192.168.0.1<br>.. | } NUMBER OF TYPES >THRESHOLD | 0:02:34.456 192.168.10.1<br>.. | } NUMBER OF TYPES ≤THRESHOLD |
| (2) 4:00 TO 8:00 | 4:00:01.000 192.168.0.2<br>.. | } NUMBER OF TYPES >THRESHOLD | 4:05:10.345 192.168.0.3<br>.. | } NUMBER OF TYPES >THRESHOLD |
| (3) 8:00 TO 12:00 | 8:00:01.234 192.168.0.2<br>.. | } NUMBER OF TYPES >THRESHOLD | 8:05:10.654 192.168.0.2<br>.. | } NUMBER OF TYPES ≤THRESHOLD |
| .. | | | | |
| (N) hh:mm TO HH:MM | hh:mm:01.000 192.168.0.1<br>.. | } NUMBER OF TYPES >THRESHOLD | hh:mm:05.555 192.168.10.1<br>.. | } NUMBER OF TYPES >THRESHOLD |

FIG.14

RELEARNING TARGET DETERMINATION INFORMATION

| PATH | PARAMETER KEY | INITIAL TIME | PREVIOUS TIME | IP ADDRESS |
|---|---|---|---|---|
| (NO DATA) | | | | |

LEARNING DEVICE, RELEARNING NECESSITY DETERMINATION METHOD, AND RELEARNING NECESSITY DETERMINATION PROGRAM

CROSS-REFERENCE TO RELATED APPLICATIONS

The present application is based on PCT filing PCT/JP2018/005962, filed Feb. 20, 2018, which claims priority to JP 2017-041123, filed Mar. 3, 2017, the entire contents of each are incorporated herein by reference.

FIELD

The present invention relates to a learning device, a relearning necessity determination method, and a relearning necessity determination program.

BACKGROUND

With the popularization of the Internet, attacks against Web servers are rapidly increasing. As countermeasures against the attacks, an Intrusion Detection System (IDS), an Intrusion Prevention System (IPS), a Web Application Firewall (WAF), and the like are known. In these techniques, pattern detection using a black list or a signature file is performed to detect and prevent known attacks.

In addition, as a technique of detecting an unknown attack, a technique of learning, as a profile, a feature of a parameter value or the like from a normal access request to a Web server and comparing a feature of an identification target access request with the profile, to thereby determine whether the target access request is an attack (not a normal access) has been known (for example, see Patent Document 1).

CITATION LIST

Patent Literature

Patent Literature 1: International Publication No. WO/2015/186662

SUMMARY

Technical Problem

However, the conventional technique of determining whether an access is an attack or not on the basis of the profile has a problem in that it is difficult to reduce operation work and simultaneously maintain a high level of attack detection accuracy.

For example, if a Web site is changed, an HTTP request of a normal access to the Web site starts to include paths and parameters that have not been included. In this case, it is impossible to determine whether the access is an attack or not by using the profile that has been learned before the change of the Web site, and in some cases, an attack may be missed. Furthermore, if specifications of a value of a parameter is changed and a text structure is changed, in some cases, erroneous detection, in which a normal access is determined as an attack, may occur.

In this case, to maintain a high level of attack detection accuracy, it is necessary to relearn the profile in accordance with the change of the Web site, but, in the conventional technique, it is impossible to detect the change of the Web site and it is difficult to determine a timing of relearning the profile.

In contrast, it may be possible to maintain a high level of attack detection accuracy by relearning the profile with high frequency regardless of whether the Web site is changed or not, but this increases operation work and is not practically applicable.

Solution to Problem

To solve a problem and to achieve an object, a learning device includes: an extraction unit configured to extract a specific request from among requests that do not match with a profile on the basis of a similarity to a request to a server, the profile determining whether the request is an attack; a determination unit configured to determine whether the specific request extracted by the extraction unit meets a predetermined condition indicating that the specific request is continuously transmitted from a certain number or more of transmission sources; and a learning unit configured to relearn the profile if the determination unit determines that the specific request meets the predetermined condition.

To solve a problem and to achieve an object, a relearning necessity determination method implemented by a learning device, the method includes: an extraction step of extracting a specific request from among requests that do not match with a profile on the basis of a similarity to a request to a server, the profile determining whether the request is an attack; and a determination step of determining whether the specific request extracted at the extraction step meets a predetermined condition indicating that the specific request is continuously transmitted from a certain number or more of transmission sources.

To solve a problem and to achieve an object, a relearning necessity determination program that causes a computer to execute: an extraction step of extracting a specific request from among requests that do not match with a profile on the basis of a similarity to a request to a server, the profile determining whether the request is an attack; and a determination step of determining whether the specific request extracted at the extraction step meets a predetermined condition indicating that the specific request is continuously transmitted from a certain number or more of transmission sources.

Advantageous Effects of Invention

According to the present invention, it is possible to reduce operation work and maintain a high level of attack detection accuracy.

BRIEF DESCRIPTION OF DRAWINGS

FIG. 10 is a diagram for explaining division into time slots according to the first embodiment.

FIG. 11 is a diagram for explaining identification of a time slot according to the first embodiment.

FIG. 13 is a diagram for explaining another process performed by the determination unit according to the first embodiment.

FIG. 14 is a diagram for explaining a relearning target determination information generation process performed by the determination unit according to the first embodiment.

DESCRIPTION OF EMBODIMENTS

Embodiments of a learning device, a relearning necessity determination method, and a relearning necessity determination program according to the present invention will be described in detail below based on the drawings. The present invention is not limited by the embodiments described below.

Configuration of First Embodiment

First, a configuration of a learning device according to a first embodiment will be described with reference to FIG. 1.

Figure 1:
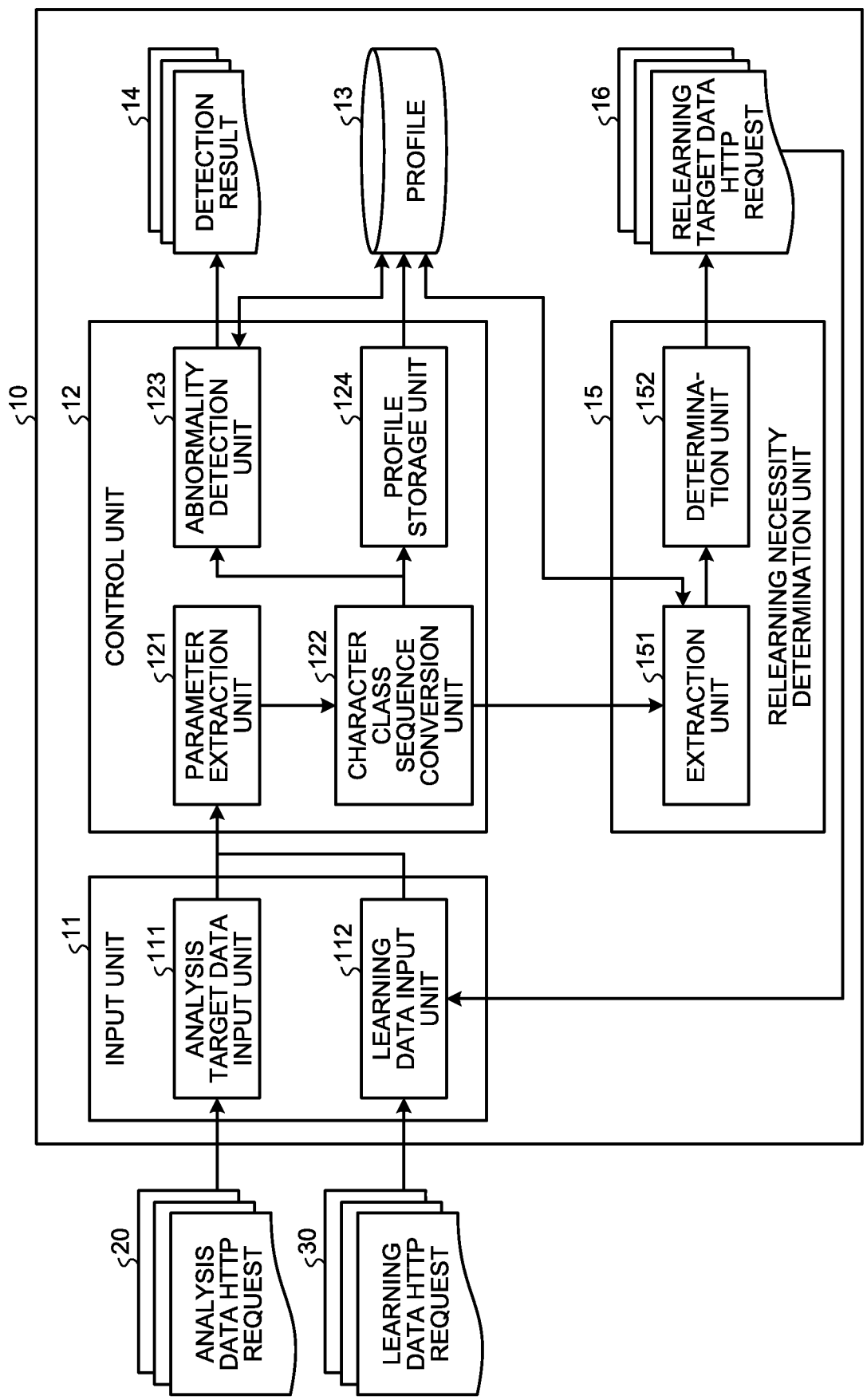
FIG. 1 is a diagram illustrating an example of a configuration of a learning device according to a first embodiment.

FIG. 1 is a diagram illustrating an example of the configuration of the learning device according to the first embodiment. As illustrated in FIG. 1, a learning device 10 includes an input unit 11, a control unit 12, and a relearning necessity determination unit 15. Further, the learning device 10 is a device that performs learning of a profile 13 that is for determining whether a request to a server is an attack or not on the basis of a similarity to the request. Furthermore, the learning device 10 is also able to detect a request serving as an attack by using the profile 13.

Moreover, the learning device 10 is able to automatically determine whether it is necessary to relearn the profile 13, on the basis of input data. If the learning device 10 determines that it is necessary to relearn the profile 13, the learning device 10 is able to automatically start relearning.

The input unit 11 receives input of data for learning or analysis in the learning device 10. The input unit 11 includes an analysis target data input unit 111 and a learning data input unit 112. The analysis target data input unit 111 receives input of an analysis data HTTP request 20. Further, the learning data input unit 112 receives input of a learning data HTTP request 30. The analysis data HTTP request 20 and the learning data HTTP request 30 are HTTP requests that are generated during access to a Web site, for example. Further, the learning data HTTP request 30 may be an HTTP request that is identified, in advance, as being an attack or as not being an attack.

The control unit 12 includes a parameter extraction unit 121, a character class sequence conversion unit 122, an abnormality detection unit 123, and a profile storage unit 124. The control unit 12 performs processes related to learning of the profile 13 and detection of a request serving as an attack.

The parameter extraction unit 121 extracts parameters from the analysis data HTTP request 20 and the learning data HTTP request 30 input to the input unit 11. The parameter extraction unit 121 extracts a path, a parameter key, and a value corresponding to the parameter key from each of the HTTP requests.

For example, if the learning data HTTP request 30 includes a URL of "http://example.com/index.php?id=03&file=Top001.png", the parameter extraction unit 121 extracts "index.php" as a path, extracts "id" and "file" as parameter keys, and extracts "03" and "Top001.png" as values corresponding to the parameter keys.

Further, the character class sequence conversion unit 122 converts the values extracted by the parameter extraction unit 121 into character class sequences. For example, the character class sequence conversion unit 122 converts "03" and "Top001.png" that are the values extracted by the parameter extraction unit 121 into character class sequences.

The character class sequence conversion unit 122 performs conversion to a character class sequence by, for example, replacing a portion composed of numeric characters in the value into "numeric", a portion composed of alphabets into "alpha", and a portion composed of symbols into "symbol". For example, the character class sequence conversion unit 122 converts the value of "03" into a character class sequence of "(numeric)". For another example, the character class sequence conversion unit 122 converts the value of "Top001.png" into a character class sequence of "(alpha, numeric, symbol, alpha)".

The abnormality detection unit 123 calculates a similarity of the path, the parameter key, and the character class sequence, which are received from the character class sequence conversion unit 122 or the like, with the profile 13, and detects an attack by comparing the calculated similarity with a threshold. For example, if the similarity of the path, the parameter key, and the character class sequence of the certain analysis data. HTTP request 20 with the profile 13 is equal to or smaller than the threshold, the abnormality detection unit 123 detects the analysis data HTTP request 20 as an attack. Further, the abnormality detection unit 123 outputs a detection result 14.

The profile storage unit 124 stores therein, as the profile 13, the paths, the parameter keys, and the character class sequences received from the character class sequence conversion unit 122. In this case, if a plurality of character class sequences corresponding to the paths and the parameter keys are present, for example, a character class sequence that most frequently appears among the plurality of character class sequences is stored as the profile 13. Through the process performed by the profile storage unit 124, the control unit 12 functions as a learning unit.

Figure 2:
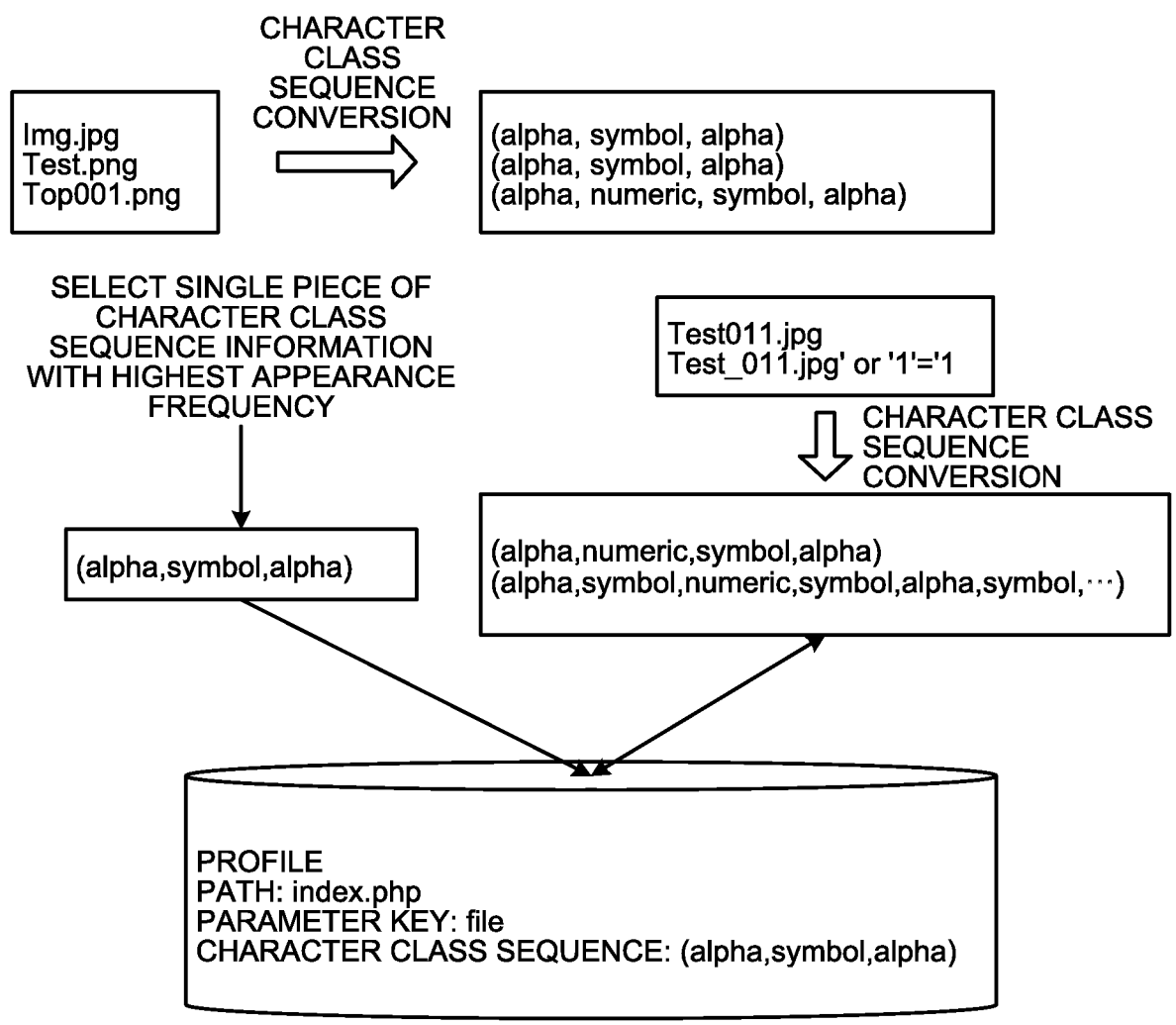
FIG. 2 is a diagram for explaining a process performed by a control unit according to the first embodiment.

A process performed by the control unit 12 will be described with reference to FIG. 2. FIG. 2 is a diagram for explaining a process performed by the control unit according to the first embodiment. First, it is assumed that the learning data HTTP request 30 includes URLs of "http://example-.com/index.php?file=Img.jpg", "http://example.com/index.php?file=Test.png" and "http://example.com/index.php?file=Top001.png". Further, it is assumed that the analysis data HTTP request 20 includes URLs of "http://example.com/index.php?file=Test011.jpg" and "http://example.com/index.php?file=Test_011.jpg' or '1'='1'".

In this case, the parameter extraction unit 121 extracts values of "Img.jpg", "Test.png", and "Top001.png" from the learning data HTTP request 30. Further, the parameter extraction unit 121 extracts values of "Test011.jpg" and "Test_011.jpg' or '1'=1'" from the analysis data HTTP request 20.

Subsequently, as illustrated in FIG. 2, the character class sequence conversion unit 122 converts the values of "Img.jpg", "Test.png", and "Top001.png" into character class sequences of "(alpha, symbol, alpha)", "(alpha, symbol, alpha)", and "(alpha, numeric, symbol, alpha)", respectively. Further, the character class sequence conversion unit 122 converts the values of "Test011.jpg" and "Test_011.jpg' or '1'='1'" into character class sequences of "(alpha, numeric, symbol, alpha)" and "(alpha, symbol, numeric, symbol, alpha, symbol, space, alpha, space, symbol, numeric, symbol, numeric)", respectively. Meanwhile, a value of "space (blank)" is converted into a character class sequence of "space".

Then, the abnormality detection unit 123 calculates a similarity between the profile 13 and data in which the path and the parameter key corresponding to the character class sequences of "(alpha, numeric, symbol, alpha)" and "(alpha, symbol, numeric, symbol, alpha, symbol, space, alpha, space, symbol, numeric, symbol, numeric)" received from the analysis data HTTP request 20 are combined, and detects an attack.

Further, the profile storage unit 124 stores, in the profile 13, "(alpha, symbol, alpha)" as the character class sequence that most frequently appears among the character class sequences corresponding to the path of "index.php" and the parameter key of "file" of the URLs included in the learning data HTTP request 30, for example.

The relearning necessity determination unit 15 includes an extraction unit 151 and a determination unit 152. The extraction unit 151 extracts a specific request from among requests that do not match with the profile 13 that is for determining whether a request to a server is an attack or not on the basis of the similarity to the request. Further, the determination unit 152 determines whether the specific request extracted by the extraction unit 151 meets a predetermined condition indicating that the request is continuously transmitted from a certain number or more of transmission sources. Furthermore, if the determination unit 152 determines that the specific request meets the predetermined condition, the control unit 12 relearns the profile 13.

Meanwhile, after the determination unit 152 performs the determination, the control unit 12 may input a relearning target data HTTP request 16 that is a determination result to the learning data input unit 112 and automatically start relearning. Further, the relearning target data HTTP request 16 may be output to the outside of the device in a data format that can be recognized by a user, for example.

In the present embodiment, the extraction unit 151 extracts New Parameter and Unmatched Value and extracts an HTTP request including New Parameter or Unmatched Value. New Parameter is a path and a parameter key that are not present in the learned profile 13. Further, Unmatched Value is a value that has a different tendency from the learned profile 13. The sameness and difference of the tendencies of the values are determined by using, for example, the character class sequences.

Furthermore, in the present embodiment, if an HTTP request including New Parameter or Unmatched Value is continuously transmitted from a certain number or more of transmission sources, the determination unit 152 determines that it is necessary to relearn the profile 13. This is because, when it is assumed that the profile 13 is a normal profile obtained by learning a feature of normal communication, and if an HTTP request including New Parameter or Unmatched Value is continuously transmitted from a certain number or more of transmission sources, the Web site may be considered as having been changed.

Meanwhile, the profile 13 may be a malicious profile obtained by learning a feature of malicious communication. In this case, the determination unit 152 determines that it is necessary to relearn the profile 13 if an HTTP request including New Parameter or Unmatched Value is other than a request that is continuously transmitted from a certain number or more of transmission sources.

Here, the HTTP request including New Parameter or Unmatched Value may be an attack. However, the number of normal users is extremely larger than the number of attackers, and therefore it is highly likely that the HTTP request transmitted from a large number of IP addresses is a request that is transmitted by normal use of the Web site rather than an attack. Further, because a period during which an attacker performs an attack is short, the HTTP request for which a transmission continuous time is long is highly likely to be a request that is issued by normal use of the Web site rather than an attack. Therefore, the HTTP request for which the determination unit 152 has determined that the HTTP request is continuously transmitted from a certain number or more of transmission sources is highly likely to be a request that is issued by normal use of the Web site rather than an attack.

The extraction unit 151 is able to extract, as the specific request, an HTTP request for which a combination of a path and a parameter key is not included in the profile 13, i.e., an HTTP request including New Parameter. Further, the extraction unit 151 is able to extract an HTTP request for which a combination of a path and a parameter key is included in the profile 13 but a combination of a path, a parameter key, and a tendency of a value is not included in the profile 13, i.e., an HTTP request including Unmatched Value, as the specific request.

Extraction of New Parameter

Figure 3:
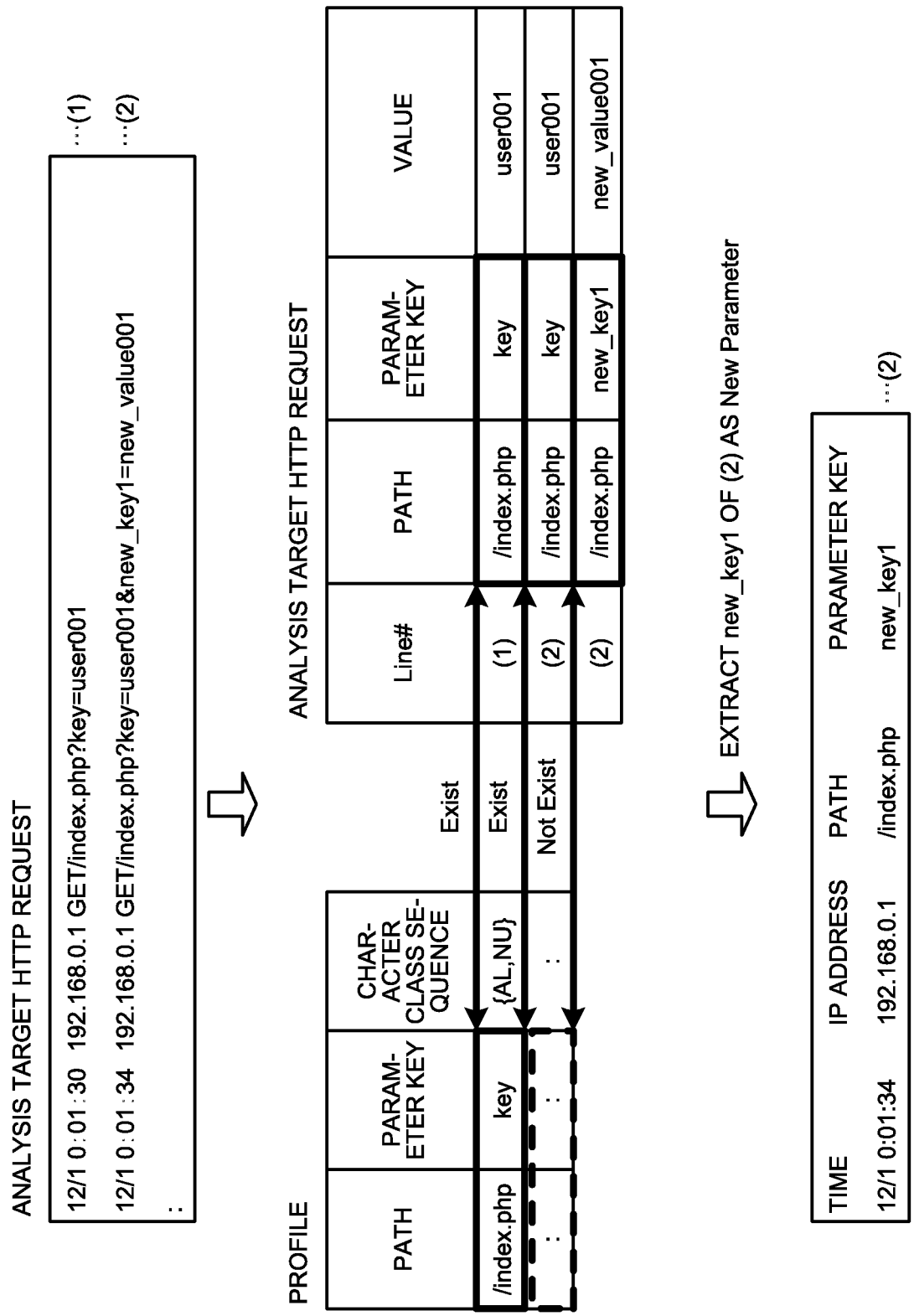
FIG. 3 is a diagram for explaining extraction of New Parameter according to the first embodiment.

Here, a process of extracting New Parameter by the extraction unit 151 will be described with reference to FIG. 3. FIG. 3 is a diagram for explaining extraction of New Parameter according to the first embodiment. If a combination of a path and a parameter key of an analysis target HTTP request is not included in the profile 13, the extraction unit 151 extracts information on the HTTP request as New Parameter.

For example, as illustrated in FIG. 3, a combination of a path of "index.php" and a parameter key of "key" included in an HTTP request of "12/1 0:01:30 192.168.0.1 GET/index.php?key=user001" is included in the profile 13, so that the extraction unit 151 does not extract information on the HTTP request of "12/1 0:01:30 192.168.0.1 GET/index.php?key=user001" as New Parameter.

In contrast, a combination of a path of "index.php" and a parameter key of "new_key1" included in an HTTP request of "12/1 0:01:34 192.168.0.1 GET/index.php?key=user001&new_key1=new_value001" is not included in the profile 13, so that the extraction unit 151 extracts information on the HTTP request of "12/1 0:01:34 192.168.0.1 GET/index.php?key=user001&new_key1=new_value001" as New Parameter.

Extraction of Unmatched Value

Figure 4:
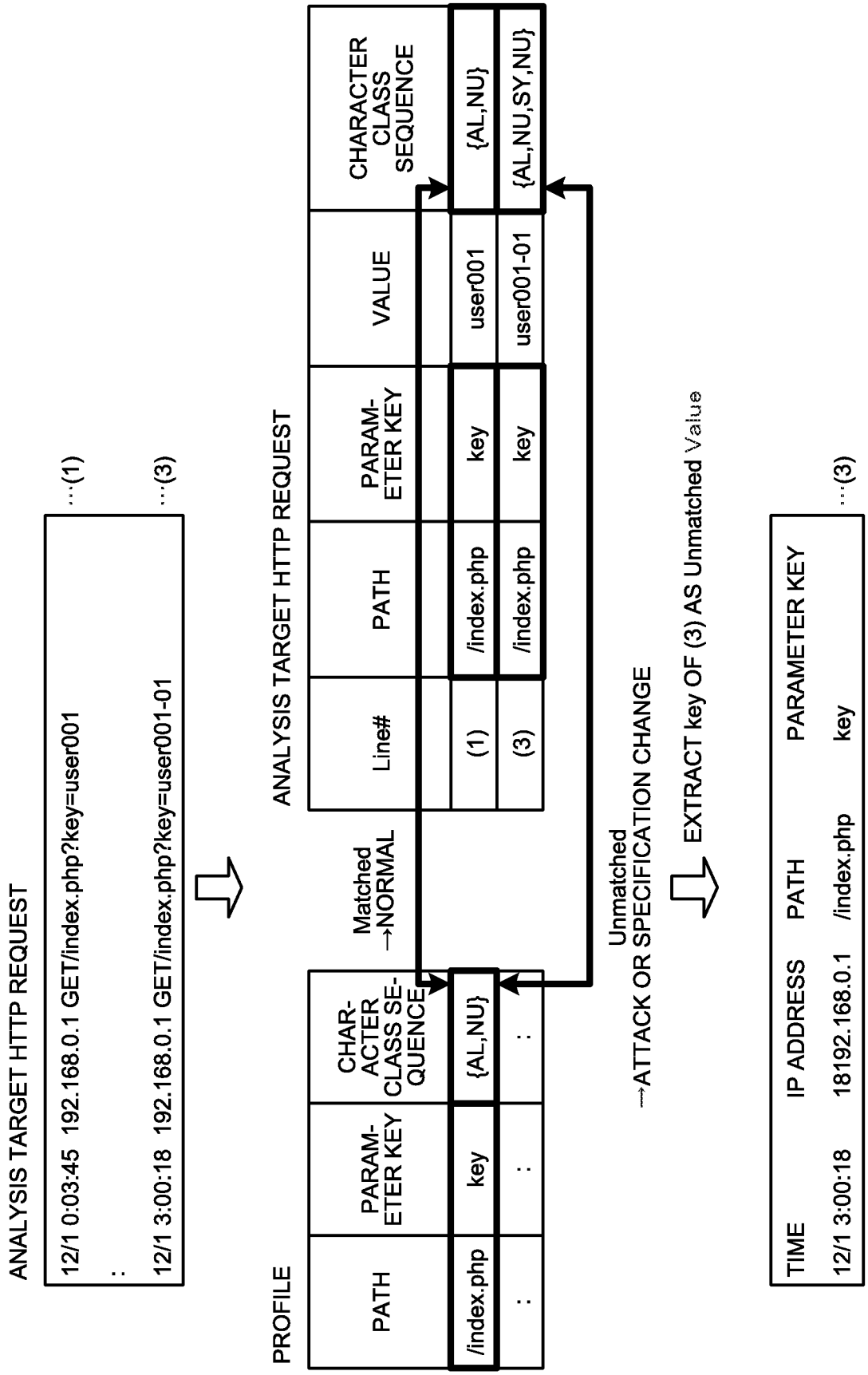
FIG. 4 is a diagram for explaining extraction of Unmatched Value according to the first embodiment.

Next, a process of extracting Unmatched Value by the extraction unit 151 will be described with reference to FIG. 4. FIG. 4 is a diagram for explaining extraction of Unmatched Value according to the first embodiment if a combination of a path and a parameter key of an analysis target HTTP request is included in the profile 13 and a combination of the path, the parameter key and, a tendency of a value is not included in the profile 13, the extraction unit 151 extracts information on the HTTP request as Unmatched Value.

For example, as illustrated in FIG. 4, a combination of a path of "index.php" and a parameter key of "key" included in an HTTP request of "12/1 0:03:45 192.168.0.1 GET/index.php?key=user001" is included in the profile 13 and a combination of the path of "index.php", the parameter key of "key", and a character class sequence "{AL, NU}" converted from a value of "user001" is also included in the profile 13. Therefore, the extraction unit 151 does not extract information on the HTTP request of "12/1 0:03:45 192.168.0.1 GET/index.php?key=user001" as Unmatched Value. Meanwhile, a notation method of the character class sequence in FIG. 4 is different from that of FIG. 2, but an arbitrary method may be adopted as the notation method of the character class sequence as long as it can be recognized in the learning device 10.

In contrast, a combination of the path of "index.php" and the parameter key of "key" included in an HTTP request of "12/1 3:00:18 192.168.0.1 GET/index.php?key=user001-01" is included in the profile 13 but a combination of the path of "index.php", the parameter key of "key", and a character class sequence of "{AL, NU, SY, NU}" converted from a value of "user001-01" is not included in the profile 13. Therefore, the extraction unit 151 extracts information on the HTTP request of "12/1 3:00:18 192.168.0.1 GET/index.php?key=user001-01" as Unmatched Value.

Figure 5:
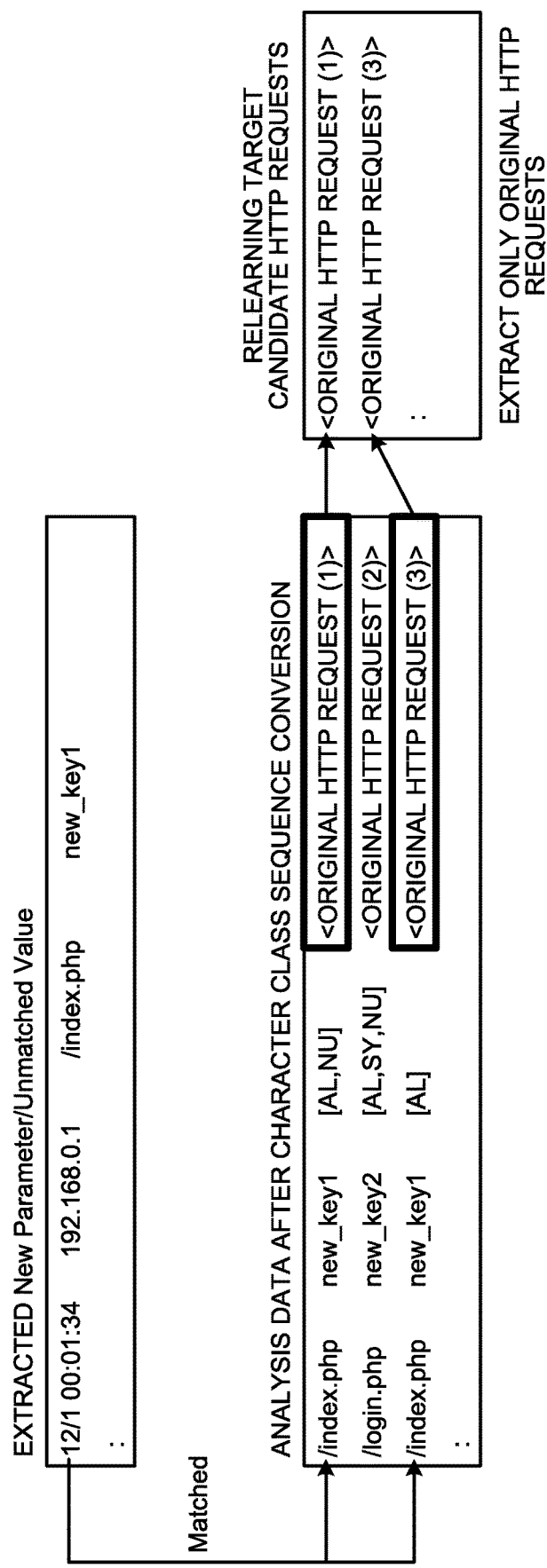
FIG. 5 is a diagram for explaining output of a processing result from an extraction unit according to the first embodiment.

Next, output from the extraction unit 151 will be described with reference to FIG. 5. FIG. 5 is a diagram for explaining output of a processing result from the extraction unit according to the first embodiment. As described above, the extraction unit 151 acquires, as New Parameter or Unmatched Value, information on the HTTP request. The information on the HTTP request includes, for example, a transmission time and date, an IP address, a path, a parameter key, a value, and the like. Further, the extraction unit 151 extracts relearning target candidate HTTP requests.

The relearning target candidate HTTP requests include a target HTTP request from which New Parameter or Unmatched Value is to be extracted and an HTTP request that has the same path and the same parameter key as those of the target HTTP request. For example, in the example in FIG. 4, the extraction unit 151 does not extract information on the HTTP request of "12/1 0:03:45 192.168.0.1 GET/index.php?key=user001" as Unmatched Value but extracts this HTTP request as the relearning target candidate HTTP request because it has the same path and the same parameter as those of the HTTP request of "12/1 3:00:18 192.168.0.1 GET/index.php?key=user001-01" that is to be extracted as Unmatched Value.

Further, as illustrated in FIG. 5, the extraction unit 151 extracts original HTTP requests, instead of HTTP requests for which values are converted to character class sequences, as the relearning candidate HTTP requests.

Modification

Figure 6:
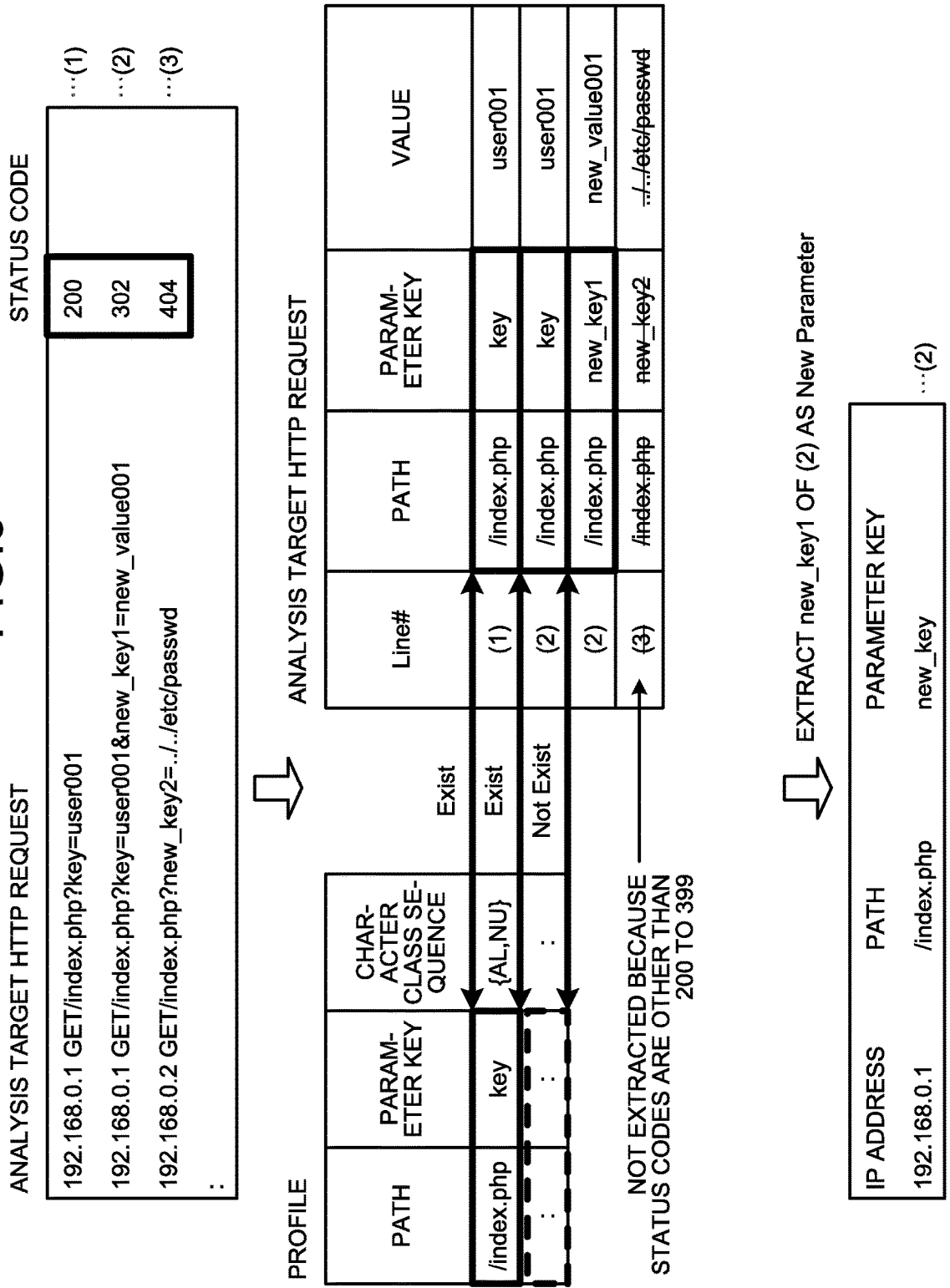
FIG. 6 is a diagram for explaining a modification of the process performed by the extraction unit according to the first embodiment.

Furthermore, as illustrated in FIG. 6, the extraction unit 151 may extract only HTTP requests whose status codes are predetermined values among HTTP requests. FIG. 6 is a diagram for explaining a modification of the process performed by the extraction unit according to the first embodiment. For example, status codes of "200 to 399" indicate normal, so that the extraction unit 151 extracts HTTP requests whose status codes are "200 to 399".

In the example in FIG. 6, an HTTP request of "192.168.0.2 GET/index.php?new_key2=../../etc/passwd" meets the above-described condition for extraction as New Parameter; however, it has a status code of "404", and therefore, in the present modification, the extraction unit 151 does not extract information on the HTTP request "192.168.0.2 GET/index.php?new_key2=../../etc/passwd" as New Parameter. While an example of New Parameter has been described above, the present modification is applicable to a case in which the extraction unit 151 extracts Unmatched Value.

Determination of Continuity

Figure 7:
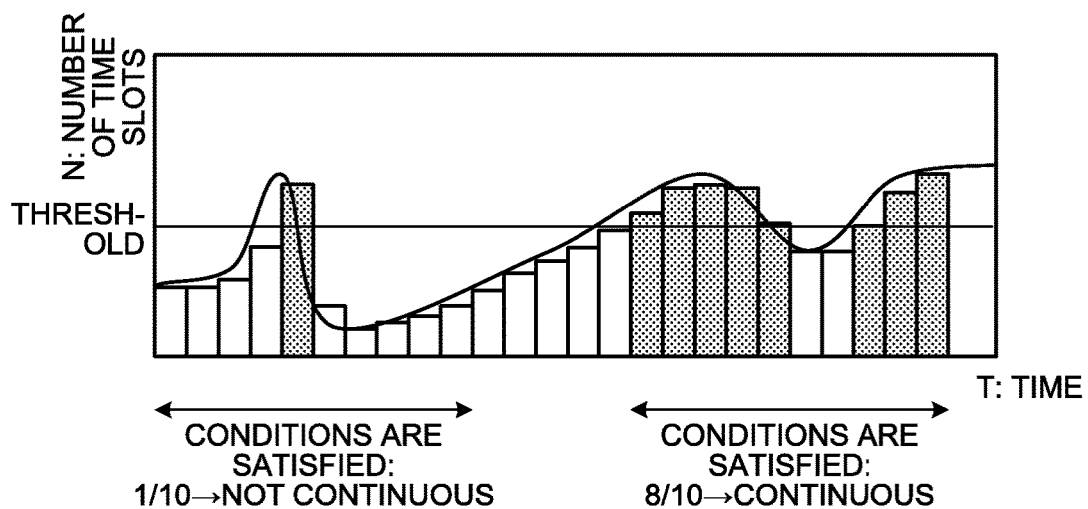
FIG. 7 is a diagram for explaining an example of a pattern with continuity according to the first embodiment.
Figure 8:
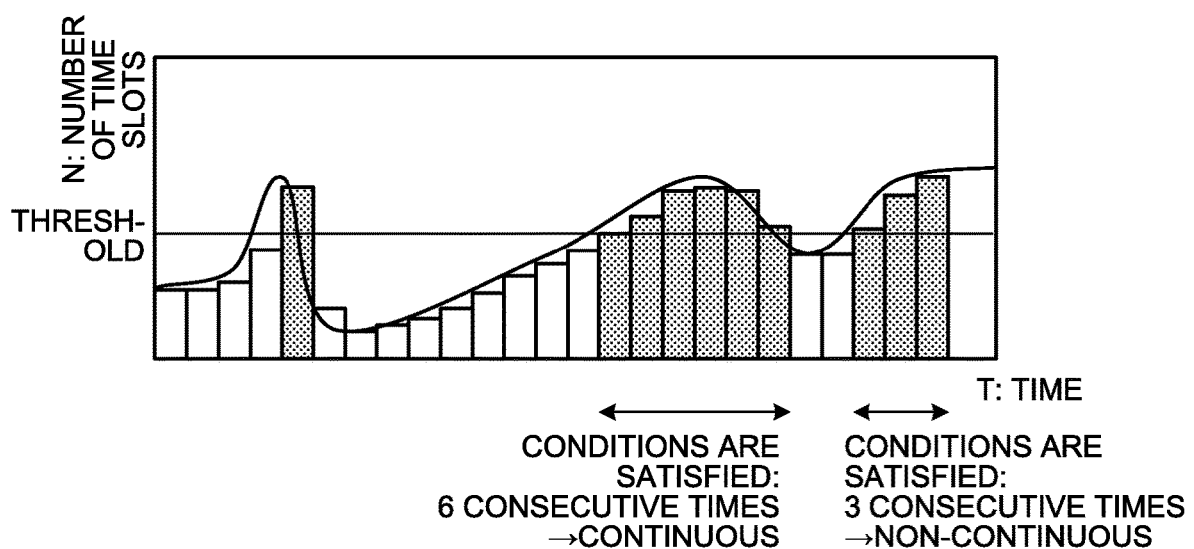
FIG. 8 is a diagram for explaining an example of the pattern with continuity according to the first embodiment.
Figure 9:
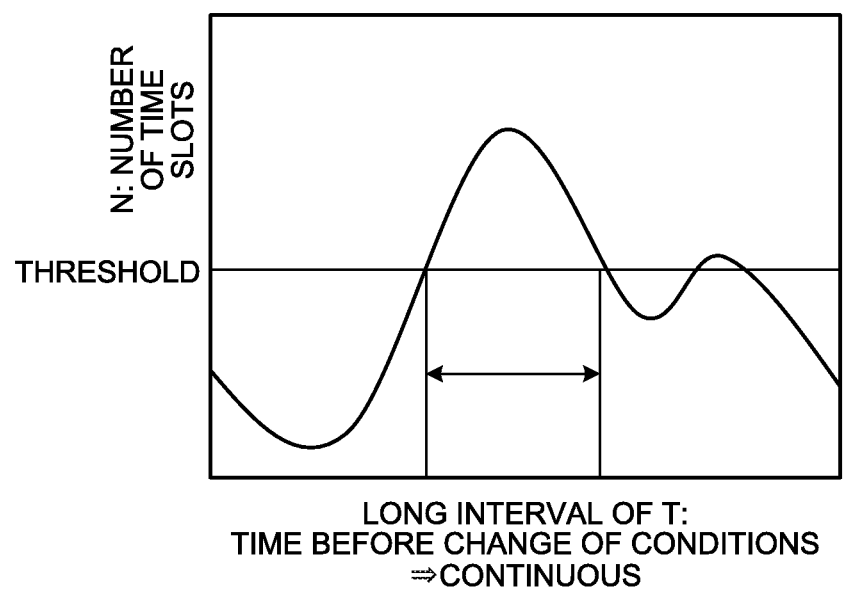
FIG. 9 is a diagram for explaining an example of the pattern with continuity according to the first embodiment.

Here, determination of continuity by the determination unit 152, i.e., a process of determining whether a request is continuously transmitted from a certain number or more of transmission sources, will be described. A pattern with continuity will be described with reference to FIGS. 7 to 9. FIGS. 7 to 9 are diagrams for explaining an example of a pattern with continuity accord in to the first embodiment.

First, as illustrated in FIG. 7, when a period including a transmission time of an HTTP request is divided into a plurality of time slots, the determination unit 152 is able to determine, as a pattern with continuity, a pattern in which time slots that meet the condition frequently appear.

For example, if a threshold for an appearance ratio of the time slots that meet the condition is set to ⁵/₁₀, as illustrated in FIG. 7, a case in which the appearance ratio of the time slots that meet the condition is ¹/₁₀ is determined as non-continuous, and a case in which the appearance ratio of the time slots that meet the condition is ⁸/₁₀ is determined as continuous.

Further, as illustrated in FIG. 8, when a period including a transmission time of an HTTP request is divided into a plurality of time slots, the determination unit 152 is able to determine, as a pattern with continuity, a pattern in which time slots that meet the condition consecutively appear.

For example, if a threshold for the number of consecutive appearances of the time slots that meet the condition is set to 5, as illustrated in FIG. 8, a case in which the time slots that meet the condition appear consecutively six times is determined as continuous, and a case in which the time slots that meet the condition appear consecutively three times or less is determined as non-continuous.

Further, as illustrated in FIG. 9, the determination unit 152 is able to determine, as a pattern with continuity, a pattern in which a time from transmission of a predetermined HTTP request to transmission of an HTTP request that is partly modified from the predetermined HTTP request meets a predetermined condition. For example, the pattern of FIG. 9 may include a pattern in which a time during which an HTTP request having a certain path, a certain parameter key and a certain tendency of a value of the parameter key is transmitted from a different transmission source IP address meets a predetermined condition.

Determination Using Time Slots

A process of determining the pattern in FIG. 7 by the determination unit 152 will be described with reference to FIG. 10. First, as illustrated in FIG. 10, the determination unit 152 divides a period including a transmission time and date of the specific request into a plurality of time slots. FIG. 10 is a diagram for explaining division into the time slots according to the first embodiment. As illustrated in FIG. 10, the determination unit 152 divides a specific period into 4-hour time slots. For example, a time slot (1) is 0:00 to 4:00. Further, a time slot (2) is 4:00 to 8:00. In this case, the determination unit 152 further arranges and allocates transmission source IP addresses of the HTTP request to each of the time slots in chronological order for each of combinations of a path and a parameter key.

Subsequently, as illustrated in FIG. 11, the determination unit 152 counts the number of types of the transmission source addresses of the specific request for each of the time slots. FIG. 11 is a diagram for explaining identification or a time slot according to the first embodiment. For example, the time slot (1) (0:00 to 4:00) of "path1:new_key1" includes three types of transmission source IP addresses, and therefore, the determination unit 152 counts the types of the transmission source addresses of the time slot as 3. In contrast, the time slot (1) (0:00 to 4:00) of "path1: new_key2" includes a single type of transmission source IP address, and therefore, the determination unit 152 counts the types of transmission sources IP addresses as 1.

Then, if a ratio of the number of time slots, in which the number of types of transmission source addresses is equal to or larger than a threshold, to the total number of the time slots is equal to or larger than a predetermined value, the determination unit 152 determines that the specific request meets the predetermined condition. Here, it is assumed that the threshold for the number of types of transmission source addresses is set to 2. In this case, as illustrated in FIG. 11, a plurality of types of transmission source addresses are observed in the time slot of "path1:new_key1", whereas not many types of transmission source addresses are observed in the time slot of "path1:new_key2".

Figure 12:
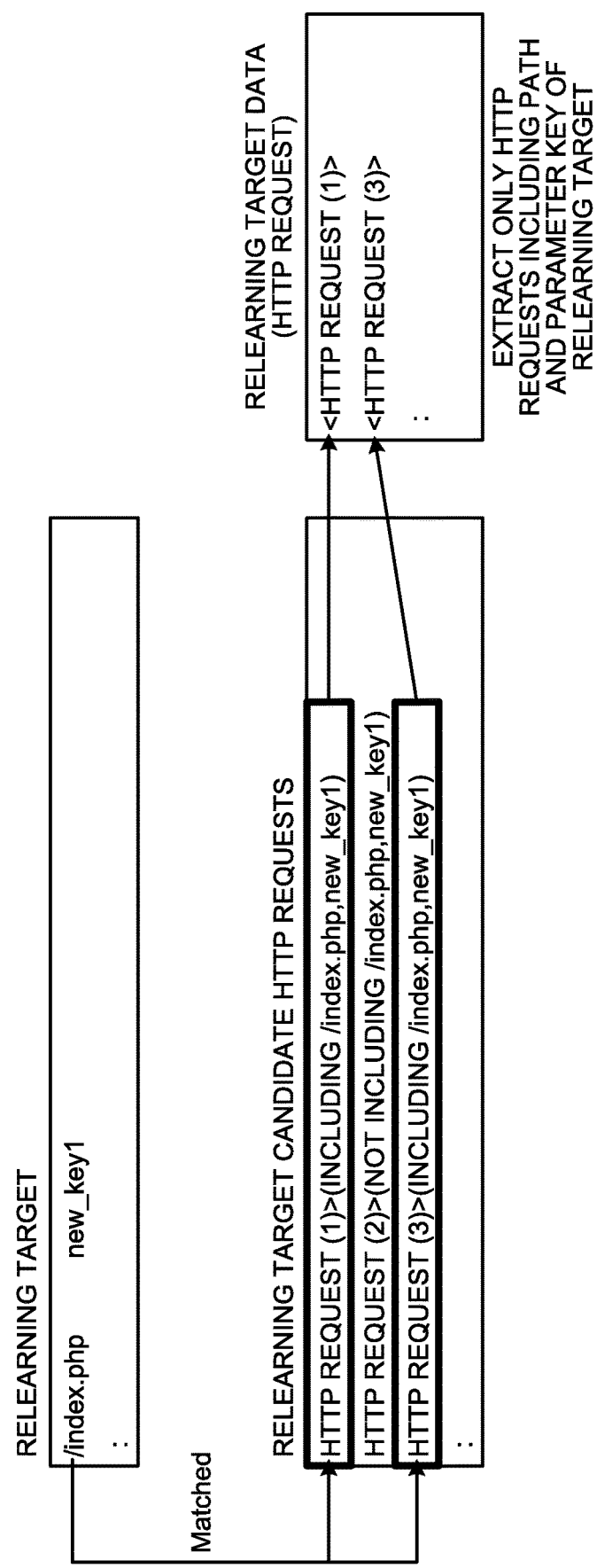
FIG. 12 is a diagram for explaining output of a processing result, from a determination unit according to the first embodiment.

Here, for example, if the ratio of the number of time slots, in which the number of types of transmission source addresses is equal to or larger than the threshold, to the total number of time slots exceeds 0.8, the determination unit 152 determines that the predetermined condition is satisfied. Then, as illustrated in FIG. 12, if it is determined that "path1:new_key1" meets the condition, HTTP requests each having a path of "path1" and the parameter key of "new_key1" among the relearning target candidate HTTP requests extracted by the extraction unit 151 are output as the relearning target data HTTP requests 16. FIG. 12 is a diagram for explaining output of a processing result from the determination unit according to the first embodiment. Meanwhile, "path1" is a symbol indicating a path of "index.php".

A process of determining the pattern in FIG. 8 by the determination unit 152 will be described with reference to FIG. 13. FIG. 13 is a diagram for explaining another process performed by the determination unit according to the first embodiment. As illustrated in FIG. 13, the determination unit 152 is able to divide a period including a transmission time and date of the specific request into a plurality of time slots, count the number of types of transmission source addresses of the specific request for each of the time slots, and determine that the specific request meets the predetermined condition if a predetermined number or more of time slots, in each of which the number of types of transmission source addresses is equal to or larger than a threshold, appear consecutively. Division into the time slots and counting of the number of types of transmission source addresses are performed in the same manner as described above with reference to FIGS. 10 and 11, and therefore, explanation thereof will be omitted.

Here, as illustrated in FIG. 13, there is a tendency that the times slots in which the number of types of transmission source addresses exceeds the threshold consecutively appear in "path1:new_key1" but the time slots in which the number of types of transmission source addresses exceeds the threshold do not consecutively appear in "path1:new_key2". For example, if the determination unit 152 finds that the times slots in which the number of types of transmission source addresses exceeds the threshold appear consecutively five times, the determination unit 152 is able to determine that the predetermined condition is satisfied.

Determination Using Relearning Target Determination Information

A process of determining the pattern in FIG. 9 by the determination unit 152 will be described with reference to FIGS. 14 to 20. FIGS. 14 to 20 are diagrams for explaining the process of determining the pattern in FIG. 9 by the determination unit according to the first embodiment.

First, as illustrated in FIG. 14, the determination unit 152 generates relearning target determination information. FIG. 14 is a diagram for explaining relearning target determination information generation process performed by the determination unit according to the first embodiment. At this time, data is not present and only items are set in the relearning target determination information.

Figure 15:
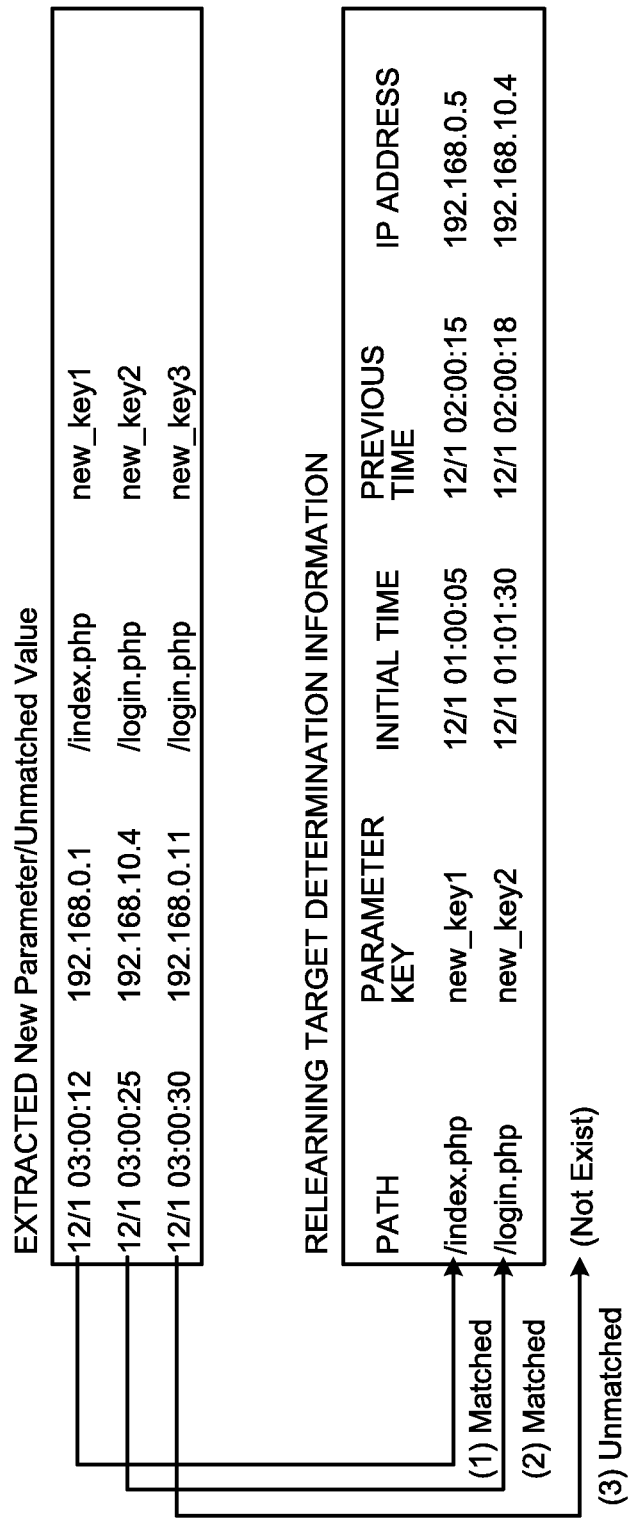
FIG. 15 is a diagram for explaining a relearning target determination information search process performed by the determination unit according to the first embodiment.

Subsequently, as illustrated in FIG. 15, the determination unit 152 sequentially searches through the relearning target determination information by using each of combinations of paths and parameter keys of New Parameter and Unmatched Value extracted by the extraction unit 151. FIG. 15 is a diagram for explaining a relearning target determination information search process performed by the determination unit according to the first embodiment. As a result of the search through the relearning target determination information, if a search result exists, the determination unit 152 performs relearning target determination information comparison related to the transmission source IP address.

Figure 16:
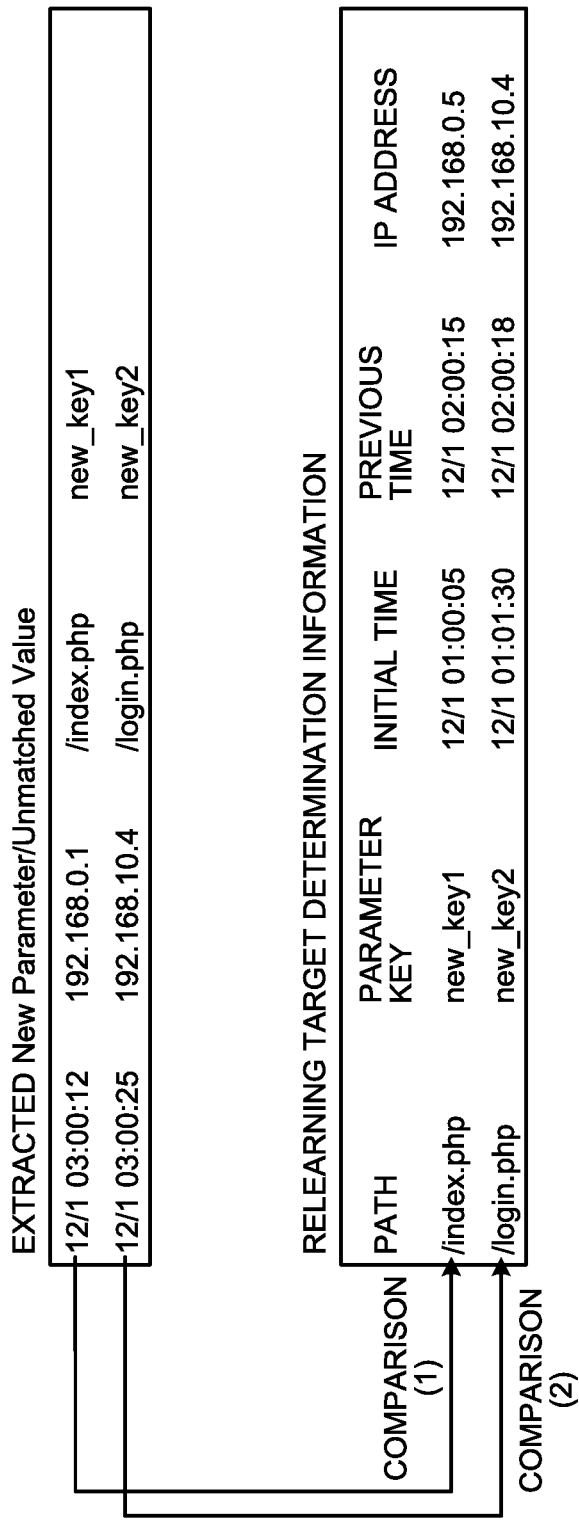
FIG. 16 is a diagram for explaining a relearning target determination information comparison process related to a transmission source IP address, which is performed by the determination unit according to the first embodiment.

The relearning target determination information comparison related to the transmission source IP address will be described with reference to FIG. 16. FIG. 16 is a diagram for explaining a relearning target determination information comparison process related to the transmission source IP address, which is performed by the determination unit according to the first embodiment. If an IP address included in the relearning target determination information that is a search result and an IP address included in New Parameter or Unmatched Value used for the search are the same (comparison (2) in FIG. 16), the determination unit 152 proceeds to next search.

In contrast, if the IP address included in the relearning target determination information of the search result and the IP address included in New Parameter or Unmatched. Value used for the search are different (comparison (1) in FIG. 16), the determination unit 152 performs the relearning target determination information comparison related to the transmission time and date.

Figure 17:
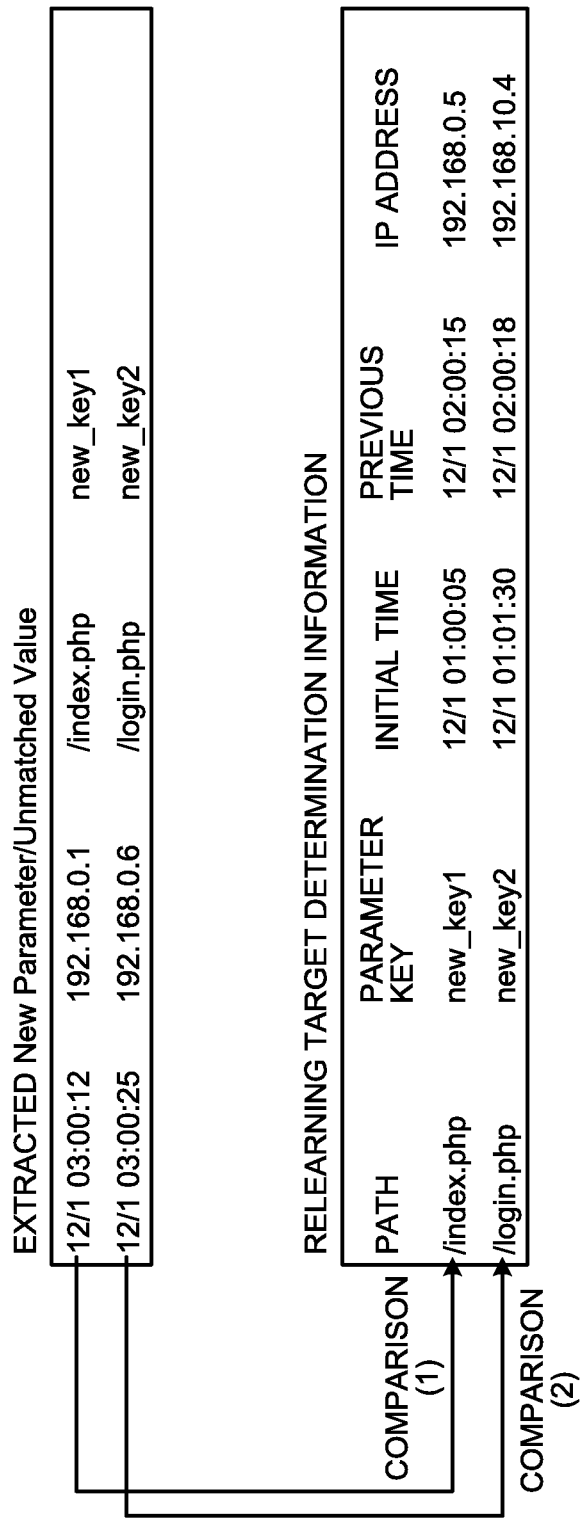
FIG. 17 is a diagram for explaining a relearning target determination information comparison process related to a transmission time and date, which is performed by the determination unit according to the first embodiment.

Here, the relearning target determination information comparison related to the transmission time and date will be described with reference to FIG. 17. FIG. 17 is a diagram for explaining the relearning target determination information comparison process related to the transmission time and date, which is performed by the determination unit according to the first embodiment. If a transmission time and date included in New Parameter or Unmatched Value used for the search is within a predetermined time (for example, 60 minutes) from the previous time included in the relearning target determination information of the search result (comparison (1) in FIG. 17), the determination unit 152 performs a relearning target determination process.

In contrast, if the transmission time and date included in New Parameter or Unmatched Value used for the search is not within the predetermined time (for example, 60 minutes) from the previous time included in the relearning target determination information of the search result (comparison (2) in FIG. 17), the determination unit 152 first performs a relearning target determination information update process, and then proceeds to next search.

Figure 18:
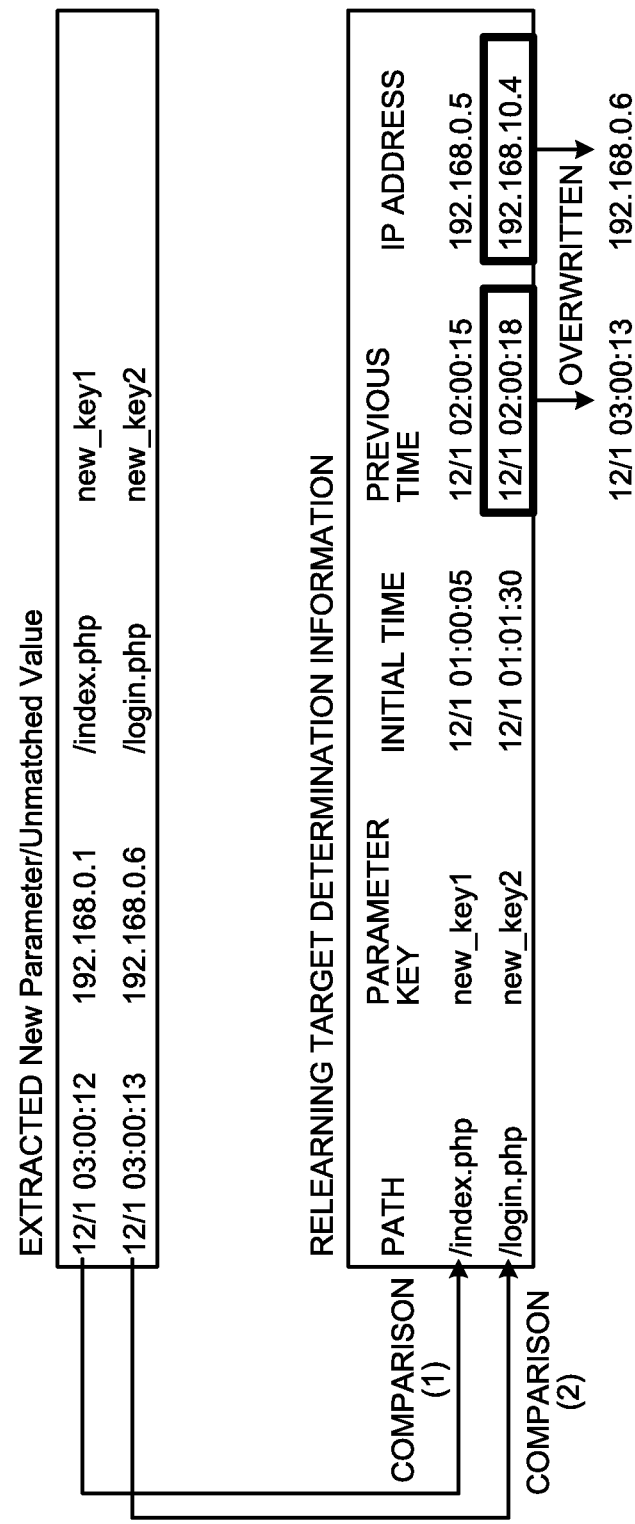
FIG. 18 is a diagram for explaining a relearning target determination process performed by the determination unit according to the first embodiment.

Here, the relearning target determination process will be described with reference to FIG. 18. FIG. 18 is a diagram for explaining the relearning target determination process performed by the determination unit according to the first embodiment. If the transmission time and date included in New Parameter or Unmatched Value used for the search indicates that a predetermined time (for example, 120 minutes) or longer has elapsed since the initial time included in the relearning target determination information of the search result (comparison (1) in FIG. 18), the determination unit 152 adopts, as the relearning target data HTTP request 16, an HTTP request having the New Parameter or Unmatched Value among the relearning target candidate HTTP requests extracted by the extraction unit 151.

In contrast, if the transmission time and date included in New Parameter or Unmatched Value used for the search does not indicate that the predetermined time (for example, 120 minutes) or longer has elapsed since the initial time included in the relearning target determination information of the search result (comparison (2) in FIG. 18), the determination unit 152 updates the previous time and the IP address of the relearning target determination information with the transmission time and date and the transmission source IP address included in the New Parameter or Unmatched Value, and proceeds to next search.

Further, if a search result does not exist as a result of the search through the relearning target determination information, the determination unit 152 performs a relearning target determination information adding process. Meanwhile, at the initial time, the relearning target determination information to be searched through is not generated, and therefore, the determination unit 152 performs the relearning target determination information adding process.

Figure 19:
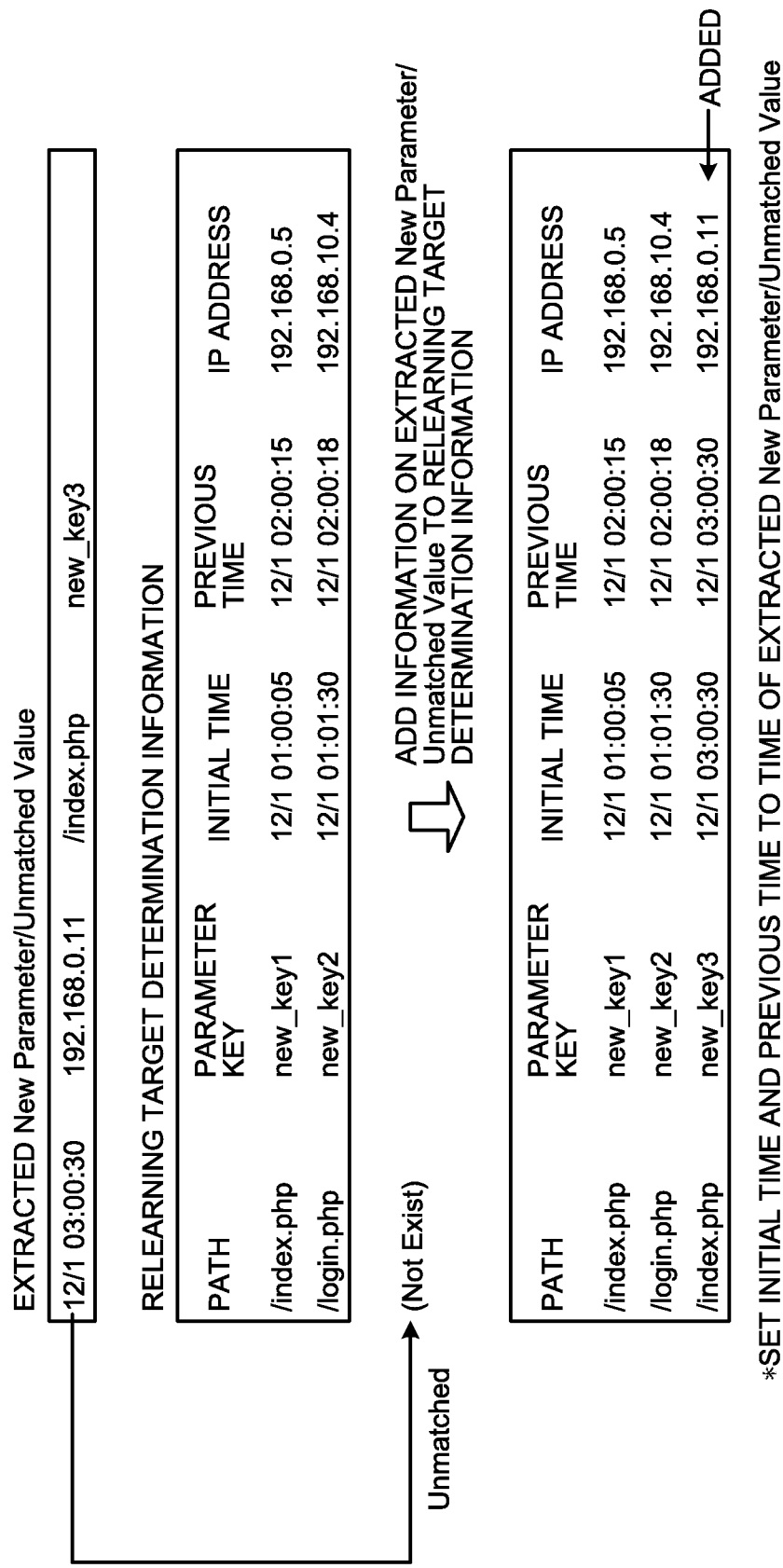
FIG. 19 is a diagram for explaining a relearning target determination information adding process performed by the determination unit according to the first embodiment.

The relearning target determination information adding process will be described with reference to FIG. 19. FIG. 19 is a diagram for explaining the relearning target determination information adding process performed by the determination unit according to the first embodiment. As illustrated in FIG. 19, in the relearning target determination information adding process, the determination unit 152 adds each piece of information included in New Parameter or Unmatched Value to the relearning target determination information. In this case, the determination unit 152 adds the transmission time and date included in New Parameter or Unmatched Value to both of the initial time and the previous time.

Figure 20:
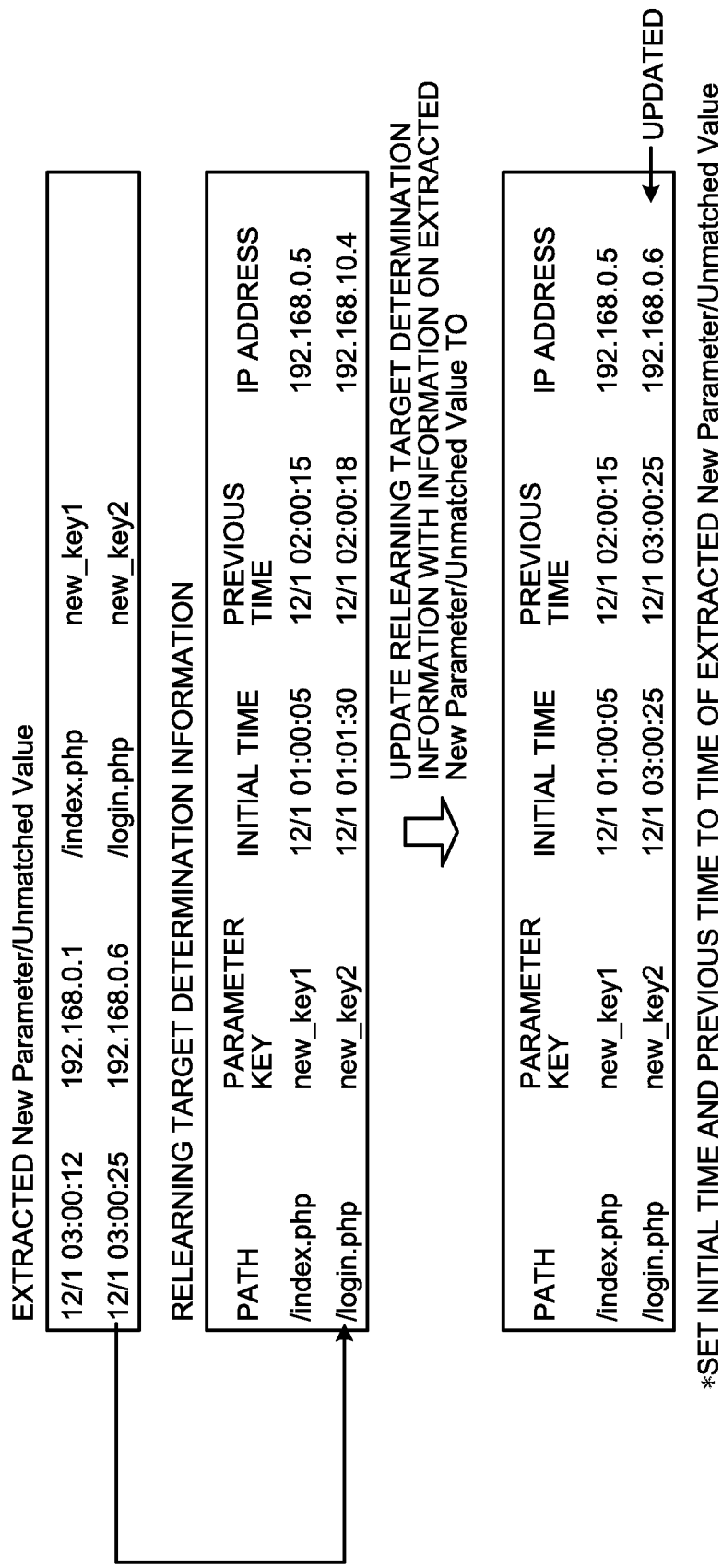
FIG. 20 is a diagram for explaining a relearning target determination information update process performed by the determination unit according to the first embodiment.

The relearning target determination information update process will be described with reference to FIG. 20. FIG. 20 is a diagram for explaining the relearning target determination information update process performed by the determination unit according to the first embodiment. As illustrated in FIG. 20, in the relearning target determination information update process, the determination unit 152 updates the relearning target determination information with each piece of information included in New Parameter or Unmatched Value. In this case, the determination unit 152 updates the previous time with the transmission time and date included in New Parameter or Unmatched Value, but does not update the initial time.

In this case, the predetermined conditions used by the determination unit 152 are more likely to be satisfied as an interval of the transmission time and date of the specific request is reduced and the number of types of transmission source addresses of the specific request is increased.

In other words, it is necessary to proceed to the relearning target determination process illustrated in FIG. 18 to determine a request as the relearning target data HTTP request 16 by the determination unit 152. To proceed to the relearning target determination process, it is necessary that, in the relearning target determination information comparison process related to the transmission time and date, the transmission time and date included in New Parameter or Unmatched Value is within a predetermined time from the previous time that is included in the relearning target determination information of the search result. Therefore, it is more likely to proceed to the relearning target determination process as the interval of the transmission time and date of a request is reduced.

Further, to proceed to the relearning target determination information comparison process related to the transmission time and date, it is necessary that, in the relearning target determination information comparison process related to the transmission source IP address, the transmission source IP address included in New Parameter or Unmatched Value is different from the IP address that is included in the relearning target determination information of the search result. Therefore, it is more likely to proceed to the relearning target determination process as the number of types of transmission source addresses is increased.

Modification

Figure 21:
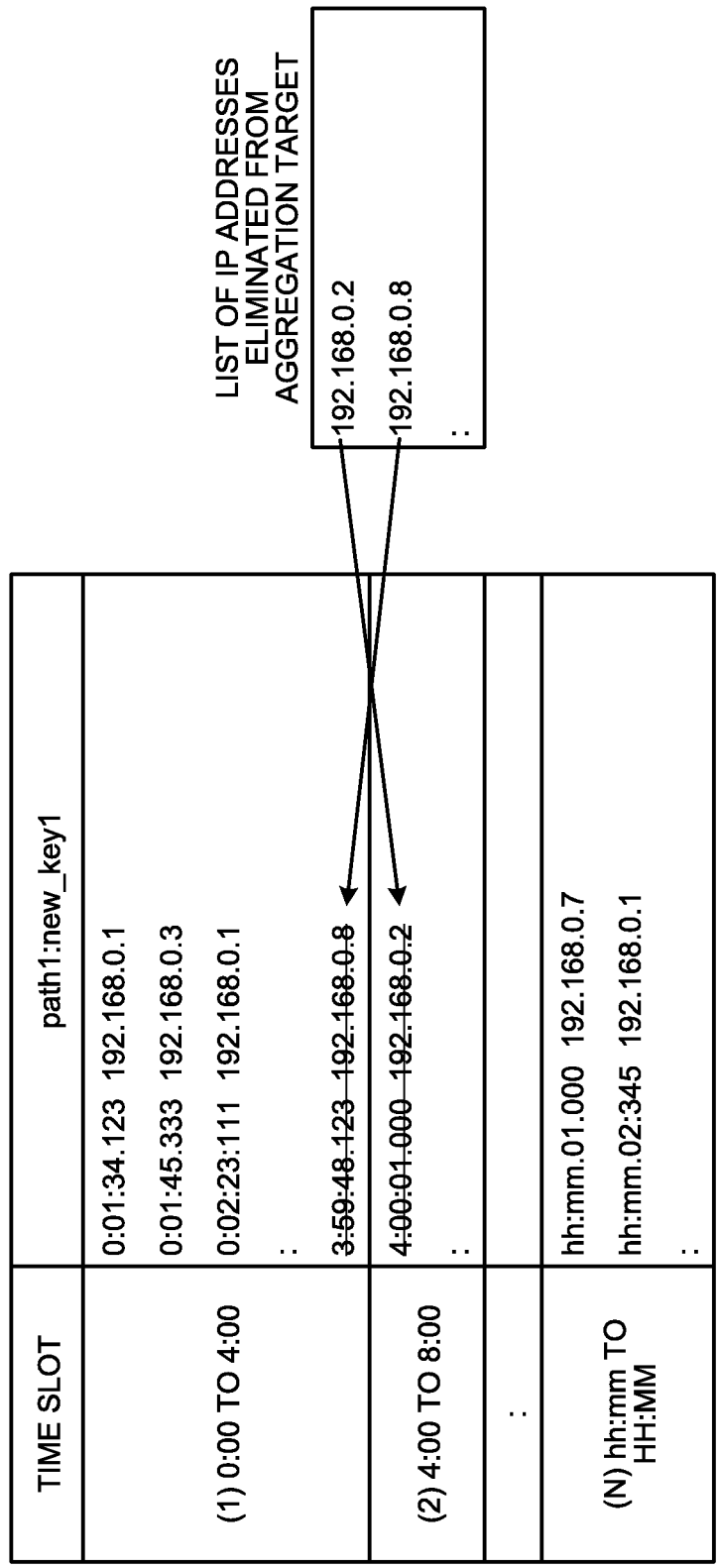
FIG. 21 is a diagram for explaining a modification of the process performed by the determination unit according to the first embodiment.

As illustrated in FIG. 21, the determination unit 152 may store a black list of IP addresses and eliminate an HTTP request from a determination target if a transmission source IP address of the HTTP request is written in the black list. FIG. 21 is a diagram for explaining a modification of the process performed by the determination unit according to the first embodiment. In the example in FIG. 21, an IP address of "192.168.0.2" is included in the black list and therefore eliminated when, for example, the number of types of addresses is counted for each of time slots.

Processes of First Embodiment

Figure 22:
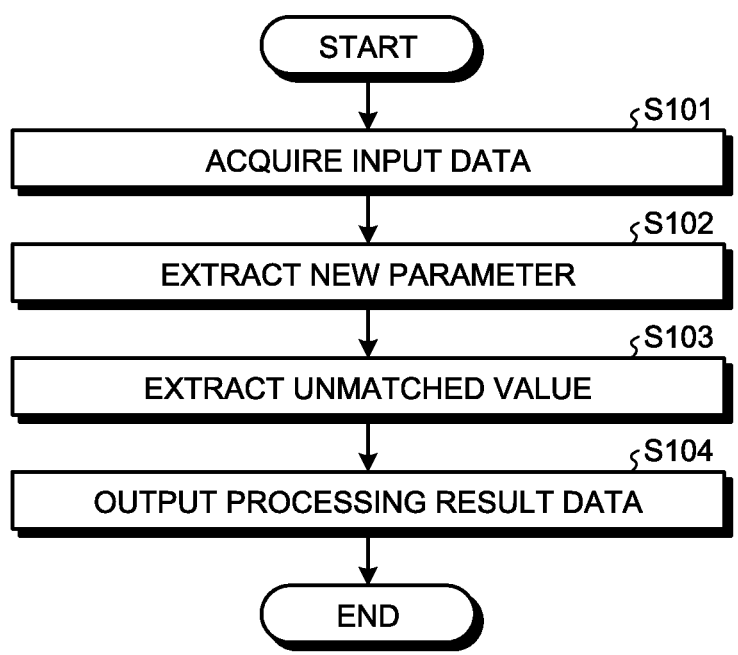
FIG. 22 is a flowchart illustrating the flow of processes performed by the extraction unit according to the first embodiment.

First, the flow of processes performed by the extraction unit 151 will be described with reference to FIG. 22. FIG. 22 is a flowchart illustrating the flow of the processes performed by the extraction unit according to the first embodiment. As illustrated in FIG. 22, the extraction unit 151 acquires an analysis target HTTP request as input data (Step S101). Subsequently, the extraction unit 151 extracts New Parameter (Step S102). Further, the extraction unit 151 extracts Unmatched Value (Step S103). Then, the extraction unit 151 outputs processing result data (Step S104).

Meanwhile, the extraction unit 151 may reverse the order of extraction of New Parameter (Step S102) and extraction of Unmatched Value (Step S103), or may perform only one of the extraction of New Parameter (Step S102) and the extraction of Unmatched Value (Step S103).

Figure 23:
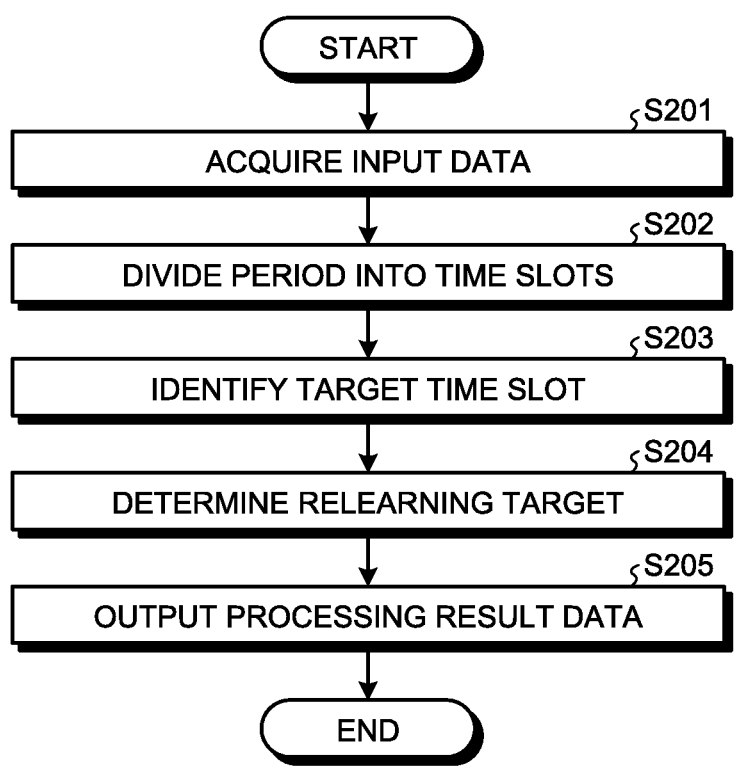
FIG. 23 is a flowchart illustrating the flow of processes using time slots by the determination unit according to the first embodiment.

Next, a determination process using time slots by the determination unit 152 will be described with reference to FIG. 23. FIG. 23 is a flowchart illustrating the flow of processes using the time slots by the determination unit according to the first embodiment. As illustrated in FIG. 23, the determination unit 152 first acquires, as input data, the processing result data from the extraction unit 151 (Step S201).

Subsequently, the determination unit 152 divides a period including the transmission time and date of the HTTP request included in the processing result data of the extraction unit 151 into a plurality of time slots (Step S202). Subsequently, the determination unit 152 identifies determination target time slots by counting the number of types of transmission source IP addresses for each of the time slots, for example (Step S203). Then, a relearning target HTTP request is determined based on appearance conditions of the identified time slots (Step S204). The appearance conditions include a ratio of time slots that meet conditions to the total, consecutiveness of the time slots that meet the conditions, and the like. Then, the determination unit 152 outputs processing result data (Step S205).

Figure 24:
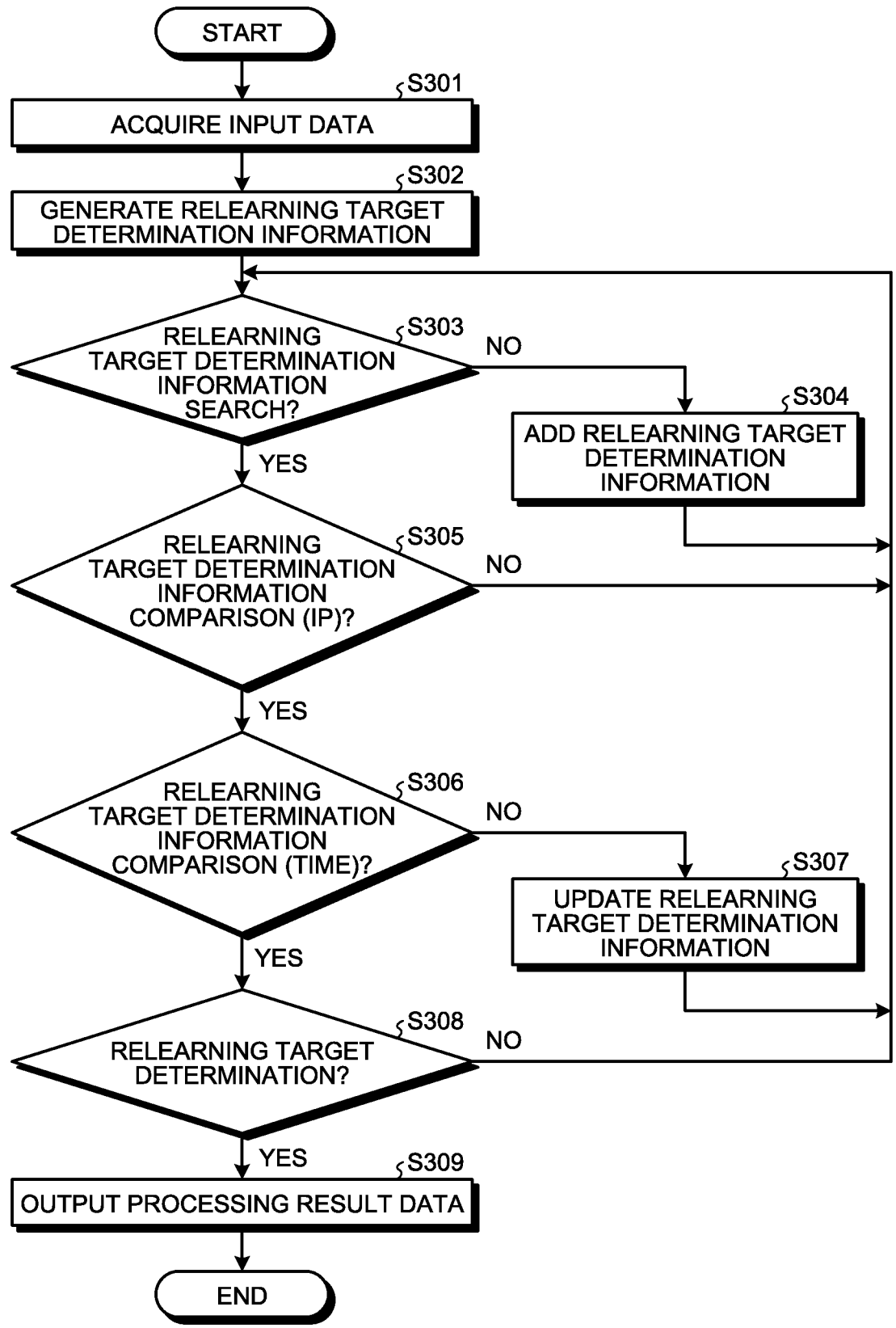
FIG. 24 is a flowchart illustrating the flow of processes using relearning target determination information by the determination unit according to the first embodiment.

Next, a determination process using the relearning target determination information will be described with reference to FIG. 24. FIG. 24 is a flowchart illustrating the flow of processes using the relearning target determination information by the determination unit according to the first embodiment. As illustrated in FIG. 24, the determination unit 152 acquires, as input data, the processing result data from the extraction unit 151 (Step S301).

Here, the determination unit 152 generates the relearning target determination information (Step S302). Subsequently, the determination unit 152 searches through the relearning target determination information by using the information on the HTTP request acquired as the input data, and if a search result does not exist (Step S303, No), the determination unit 152 performs the relearning target determination information adding process (Step S304), and proceeds to next search. If a search result exists (Step S303, Yes), the determination unit 152 performs the relearning target determination information comparison process related to the transmission source IP address (Step S305).

As a result of the relearning target determination information comparison process related to the transmission source IP address, if the IP address is different (Step S305, Yes), the determination unit 152 performs the relearning target determination information comparison process related to the transmission time and date (Step S306). Further, as a result of the relearning target determination information comparison process related to the transmission source IP address, if the IP address is not different (Step S305, No), the determination unit 152 proceeds to next search.

As a result of the relearning target determination information comparison process related to the transmission time and date, if the transmission time and date is within a predetermined time from the previous time (Step S306, Yes), the determination unit 152 performs the relearning target determination process (Step S308). Further, as a result of the relearning target determination information comparison process related to the transmission time and date, if the transmission time and date is not within the predetermined time from the previous time (Step S306, No), the determination unit 152 performs the relearning target determination information update process (Step S307), and proceeds to next search.

Furthermore, as a result of the relearning target determination process, if the transmission time and date indicates that the predetermined time or longer has elapsed since the initial time (Step S308, Yes), the HTTP request is handled as a relearning target, and processing result data is output (Step S309). Moreover, as a result of the relearning target determination process, if the transmission time and date does not indicate that the predetermined time or longer has elapsed since the initial time (Step S308, No), the determination unit 152 updates the IP address and the previous time of the relearning target determination information, and proceeds to next search.

Effects of First Embodiment

The extraction unit 151 extracts a specific request from among requests that do not match with the profile 13 that is for determining whether the request is an attack or not on the basis of the similarity to the request to the server. Further, the determination unit 152 determines whether the specific request extracted by the extraction unit 151 meets a predetermined condition indicating that the request is continuously transmitted from a certain number or more of transmission sources. Furthermore, if the determination unit 152 determines that the specific request meets the predetermined condition, the control unit 12 relearns the profile 13. Therefore, it is possible to relearn the profile if needed, so that it is possible to reduce operation work and maintain a high level of attack detection accuracy.

The extraction unit 151 is able to extract, as the specific request, an HTTP request for which a combination of a path and a parameter key is not included in the profile 13. Therefore, it is possible to modify the profile in accordance with a path and a parameter key that have newly appeared, so that it is possible to prevent an attack from being missed.

The extraction unit 151 is able to extract, as the specific request, an HTTP request for which a combination of a path and a parameter key is included in the profile 13 and a combination of the path, the parameter key, and a tendency of a value is not included in the profile 13. Therefore, even when specifications (text structure) of a value of a known parameter key are changed, it is possible to modify the profile in accordance with the specifications, so that it is possible to prevent erroneous detection of an attack.

The determination unit 152 is able to divide a period including the transmission time and date of the specific request into a plurality of time slots, count the number of types of transmission source addresses of the specific request for each of the time slots, and determine that the specific request meets the predetermined condition if a ratio of the number of time slots, in which the number of types of transmission source addresses is equal to or larger than a threshold, to the total number of the time slots is equal to or higher than a predetermined value. Therefore, it is possible to determine a request that is continuously transmitted from a certain number or more of transmission sources, on the basis of an appearance frequency of time slots.

The determination unit 152 is able to divide a period including the transmission time and date of the specific request into a plurality of time slots, count the number of types of transmission source addresses of the specific request for each of the time slots, and determine that the specific request meets the predetermined condition if a predetermined number or more of time slots, in each of which the number of types of transmission source addresses is equal to or larger than a threshold, appear consecutively. Therefore, it is possible to determine a request that is continuously transmitted from a certain number or more of transmission sources, on the basis of the consecutiveness of appearance of the time slots.

The predetermined condition used by the determination unit 152 may be set so as to be more likely to be satisfied as an interval of the transmission time and date of the specific request is reduced and the number of types of transmission source addresses of the specific request is increased. Therefore, it is possible to set a condition based on a tendency that is likely to be observed when a Web site is changed, and determine a request that is continuously transmitted from a certain number or more of transmission sources.

Program

As one embodiment, the learning device 10 may be implemented by installing, as package software or online software, a relearning necessity determination program, which performs the above-described relearning necessity determination, in a desired computer. For example, by causing an information processing apparatus to execute the above-described relearning necessity determination program, it is possible to cause the information processing apparatus to function as the learning device 10. The information processing apparatus described here includes a desktop personal computer or a notebook personal computer. In addition, the information processing apparatus includes a mobile communication terminal, such as a smartphone, a mobile phone, or a Personal Handyphone System (PHS), a slate device, such as a Personal Digital Assistant (PDA), and the like.

Furthermore, the learning device 10 may be implemented as a learning server device for which a terminal device used by a user is adopted as a client and which provides services related to the above-described relearning necessity determination to the client. For example, the learning server device may be implemented as a server device that handles an analysis target HTTP request as an input and a relearning target HTTP request as an output. In this case, the learning server device may be implemented as a Web server or a cloud that provides services related to the above-described relearning necessity determination by outsourcing.

Figure 25:
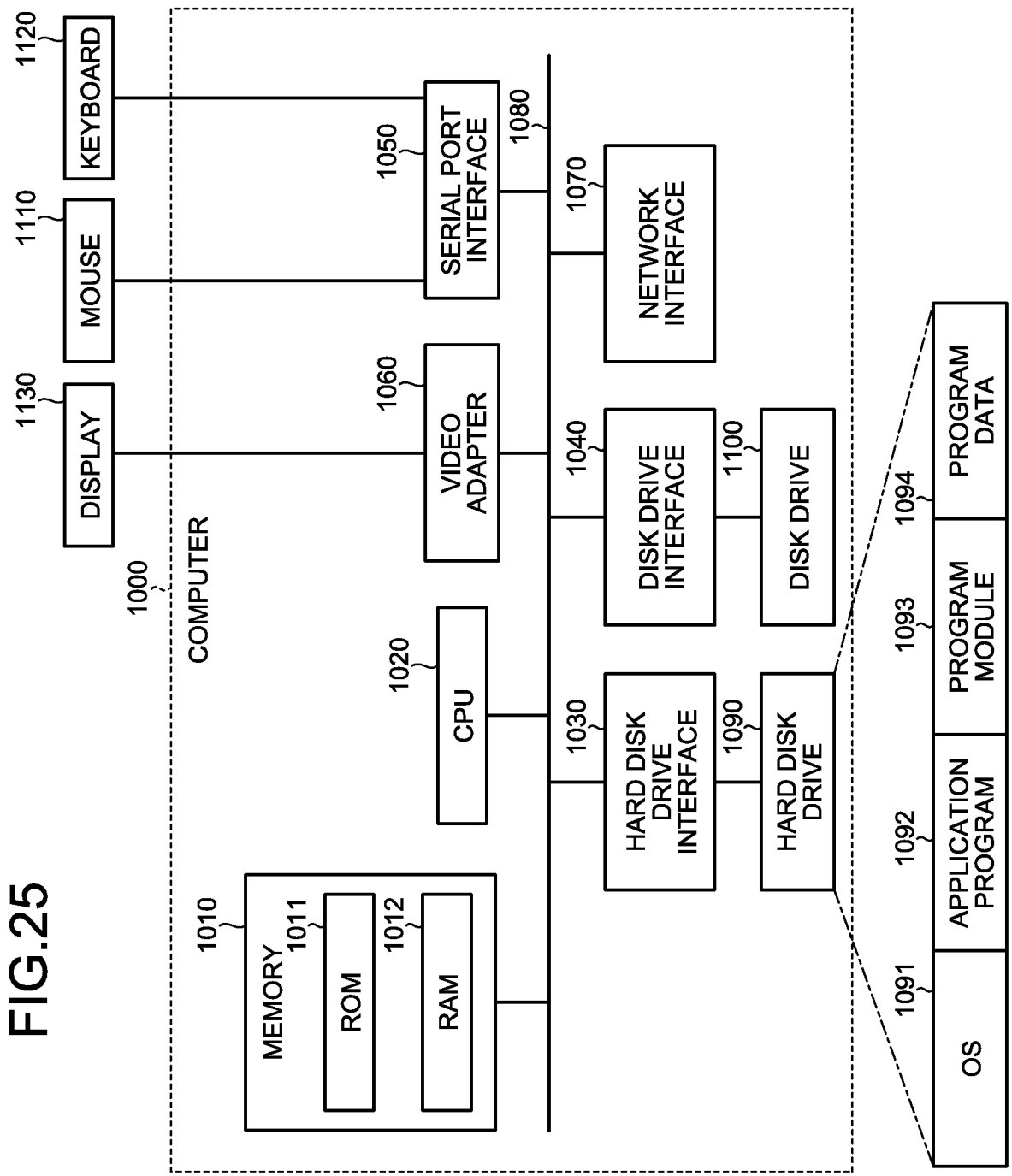
FIG. 25 is a diagram illustrating an example of a computer that implements a learning device by executing a program.

FIG. 25 is a diagram illustrating an example of a computer that implements the learning device by executing a program. A computer 1000 includes, for example, a memory 1010 and a CPU 1020. Further, the computer 1000 includes a hard disk drive interface 1030, a disk drive interface 1040, a serial port interface 1050, a video adapter 1060, and a network interface 1070. All of these units are connected to one another via a bus 1080.

The memory 1010 includes a read only memory (ROM) 1011 and a random access memory (RAM) 1012. The ROM 1011 stores therein, for example, a boot program, such as Basic Input Output System (BIOS). The hard disk drive interface 1030 is connected to a hard disk drive 1090. The disk drive interface 1040 is connected to a disk drive 1100. For example, a removable storage medium, such as a magnetic disk or an optical disk, is inserted in the disk drive 1100. The serial port interface 1050 is connected to, for example, a mouse 1110 and a keyboard 1120. The video adapter 1060 is connected to, for example, a display 1130.

The hard disk drive 1090 stores therein, for example, an OS 1091, an application program 1092, a program module 1093, and a program data 1094. In other words, a program that defines each of the processes of the learning device 10 is implemented as the program module 1093 in which codes that can be executed by the computer are written. The program module 1093 is stored in, for example, the hard disk drive 1090. For example, the program module 1093 for executing the same processes as those of the functional configuration of the learning device 10 is stored in the hard disk drive 1090. Meanwhile, the hard disk drive 1090 may be replaced with an SSD.

Furthermore, setting data used in the processes of the embodiment as described above is stored, as the program data 1094, in the memory 1010 or the hard disk drive 1090, for example. Then, the CPU 1020 reads the program module 1093 and the program data 1094 stored in the memory 1010 or the hard disk drive 1090 onto the RAM 1012, and executes them if needed.

Meanwhile, the program module 1093 and the program data 1094 need not always be stored in the hard disk drive 1090, but may be stored in, for example, a removable storage medium and read by the CPU 1020 via the disk drive 1100 or the like. Alternatively, the program module 1093 and the program data 1094 may be stored in other computers connected via a network (Local Area Network (LAN), Wide Area Network (WAN), or the like). Then, the program module 1093 and the program data 1094 may be read by the CPU 1020 from the other computers via the network interface 1070.

REFERENCE SIGNS LIST

10 LEARNING DEVICE
11 INPUT UNIT
12 CONTROL UNIT
13 PROFILE
14 DETECTION RESULT
15 RELEARNING NECESSITY DETERMINATION UNIT
16 RELEARNING TARGET DATA HTTP REQUEST
20 ANALYSIS DATA HTTP REQUEST
30 LEARNING DATA HTTP REQUEST
111 ANALYSIS TARGET DATA INPUT UNIT
112 LEARNING DATA INPUT UNIT
121 PARAMETER EXTRACTION UNIT
122 CHARACTER CLASS SEQUENCE CONVERSION UNIT
123 ABNORMALITY DETECTION UNIT
124 PROFILE STORAGE UNIT
151 EXTRACTION UNIT
152 DETERMINATION UNIT

The invention claimed is:
1. A learning device comprising:
a memory; and a processor coupled to the memory and programmed to execute a process comprising:

extracting a specific request from among requests that do not match with a profile on the basis of a similarity to a request to a server, the profile determining whether the request is an attack;

determining whether the specific request extracted by the extracting meets a predetermined condition indicating that the specific request is continuously transmitted from a certain number or more of transmission sources having a number of types of transmission source addresses; and relearning the profile if the determining determines that the specific request meets the predetermined condition, wherein the determining determines whether the number of types of transmission source addresses is equal to or larger than a threshold.

2. The learning device according to claim 1, wherein the extracting extracts, as the specific request, an HTTP request for which a combination of a path and a parameter key is not included in the profile.

3. A learning device comprising:

a memory; and a processor coupled to the memory and programmed to execute a process comprising:

extracting a specific request from among requests that do not match with a profile on the basis of a similarity to a request to a server, the profile determining whether the request is an attack;

determining whether the specific request extracted by the extracting meets a predetermined condition indicating that the specific request is continuously transmitted from a certain number or more of transmission sources; and relearning the profile if the determining determines that the specific request meets the predetermined condition, wherein the extracting extracts, as the specific request, an HTTP request for which a combination of a path and a parameter key is included in the profile and a combination of the path, the parameter key, and a tendency of a value is not included in the profile.

4. The learning device according to claim 1, wherein the process further comprises:

dividing a period including a transmission time and date of the specific request into a plurality of time slots, and counting the number of types of transmission source addresses of the specific request for each of the time slots, wherein the determining determines that the specific request meets the predetermined condition if a ratio of a number of the time slots, in which the number of types of transmission source addresses is equal to or larger than the threshold, to a total number of the time slots is equal to or larger than a predetermined value.

5. The learning device according to claim 1, wherein the process further comprises:

dividing a period including a transmission time and date of the specific request into a plurality of time slots, and counting the number of types of transmission source addresses of the specific request for each of the time slots, wherein the determining determines that the specific request meets the predetermined condition if a predetermined number or more of the time slots, in each of which the number of types of transmission source addresses is equal to or larger than the threshold, appear consecutively.

6. The learning device according to claim 1, wherein the predetermined condition used by the determining is more likely to be satisfied as an interval of a transmission time and date of the specific request is reduced and a number of types of transmission source addresses of the specific request is increased.

7. A relearning necessity determination method implemented by a learning device, the method comprising:

extracting a specific request from among requests that do not match with a profile on the basis of a similarity to a request to a server, the profile determining whether the request is an attack; and determining whether the specific request extracted at the extracting meets a predetermined condition indicating that the specific request is continuously transmitted from a certain number or more of transmission sources having a number of types of transmission source addresses, wherein the determining determines whether the number of types of transmission source addresses is equal to or larger than a threshold.

8. A non-transitory computer-readable recording medium having stored therein a program, for relearning necessity determination, that causes a computer to execute a process comprising:

extracting a specific request from among requests that do not match with a profile on the basis of a similarity to a request to a server, the profile determining whether the request is an attack; and determining whether the specific request extracted at the extracting meets a predetermined condition indicating that the specific request is continuously transmitted from a certain number or more of transmission sources having a number of types of transmission source addresses, wherein the determining determines whether the number of types of transmission source addresses is equal to or larger than a threshold.

* * * * *